United States Patent
Smith, III et al.

(10) Patent No.: US 10,846,112 B2
(45) Date of Patent: Nov. 24, 2020

(54) SYSTEM AND METHOD OF GUIDING A USER IN UTILIZING FUNCTIONS AND FEATURES OF A COMPUTER BASED DEVICE

(71) Applicant: Symmpl, Inc., Santa Clarita, CA (US)

(72) Inventors: Jay Smith, III, Santa Clarita, CA (US); Anson Sims, Granada Hills, CA (US)

(73) Assignee: SYMMPL, INC., Santa Clarita, CA (US)

( * ) Notice: Subject to any disclaimer, the term of this patent is extended or adjusted under 35 U.S.C. 154(b) by 23 days.

(21) Appl. No.: 16/246,909

(22) Filed: Jan. 14, 2019

(65) Prior Publication Data

US 2019/0146815 A1     May 16, 2019

Related U.S. Application Data

(63) Continuation-in-part of application No. 14/593,261, filed on Jan. 9, 2015, now abandoned.

(60) Provisional application No. 61/964,820, filed on Jan. 16, 2014.

(51) Int. Cl.
    *G06F 9/451*      (2018.01)
    *G06F 16/2457*      (2019.01)
    *G06F 3/0484*      (2013.01)

(52) U.S. Cl.
    CPC ............ *G06F 9/453* (2018.02); *G06F 3/0484* (2013.01); *G06F 16/2457* (2019.01)

(58) Field of Classification Search
    CPC ..... G06F 9/453; G06F 3/0484; G06F 16/2457
    See application file for complete search history.

(56) References Cited

U.S. PATENT DOCUMENTS

| | | | | |
|---|---|---|---|---|
| 5,442,759 | A | * | 8/1995 | Chiang ................. G06Q 50/205 434/118 |
| 5,524,201 | A | * | 6/1996 | Shwarts ................... G06F 16/40 715/763 |
| 5,601,432 | A | * | 2/1997 | Bergman ................. G09B 5/14 434/118 |
| 5,890,905 | A | * | 4/1999 | Bergman ............... G06Q 40/00 434/107 |
| 6,466,654 | B1 | | 10/2002 | Cooper et al. |
| 6,535,865 | B1 | * | 3/2003 | Skaaning ........... G05B 23/0281 370/389 |

(Continued)

*Primary Examiner* — Haoshian Shih
*Assistant Examiner* — Alvaro R Calderon, IV

(57) ABSTRACT

A system/method is provided for guiding a user in utilizing functions of a computer-based device. The computer-based method includes operating a software application that interfaces with one or more applications on one or more remote computing devices. The computed-based method includes rendering a first screen having a plurality of display elements that are linked to a plurality of activities including a first activity and a second activity. The computer-based method includes receiving a selection of a display element of the plurality of display elements that is linked to the first activity. The computer-based method includes obtaining first activity information that includes first ancillary information. The computer-based method includes generating an inference of an interest or preference of a user based on the first ancillary information and outputting or performing a suggestion or recommendation to the user based on the inference of the interest or preference of the user.

18 Claims, 15 Drawing Sheets

(56) References Cited

U.S. PATENT DOCUMENTS

| | | |
|---|---|---|
| 6,757,362 B1 | 6/2004 | Cooper et al. |
| 6,804,332 B1* | 10/2004 | Miner .................. H04M 3/42 |
| | | 379/88.13 |
| 8,311,835 B2* | 11/2012 | Lecoeuche ........ H04M 1/72561 |
| | | 704/270 |
| 8,577,422 B1* | 11/2013 | Ledet .................. G06F 3/011 |
| | | 455/566 |
| 9,798,385 B1* | 10/2017 | Das .................. G06T 19/006 |
| 2001/0041980 A1 | 11/2001 | Howard et al. |
| 2002/0085045 A1 | 7/2002 | Vong et al. |
| 2002/0118220 A1* | 8/2002 | Lui .................. G06F 9/453 |
| | | 715/709 |
| 2002/0138582 A1* | 9/2002 | Chandra .............. G06Q 10/10 |
| | | 709/206 |
| 2002/0156774 A1 | 10/2002 | Beauregard et al. |
| 2003/0046101 A1* | 3/2003 | Dow .................. G06Q 10/107 |
| | | 705/1.1 |
| 2003/0046401 A1* | 3/2003 | Abbott ................ G06F 9/451 |
| | | 709/228 |
| 2003/0058267 A1* | 3/2003 | Warren ................ G06F 16/34 |
| | | 715/705 |
| 2003/0071846 A1 | 4/2003 | Balassanian |
| 2004/0225650 A1* | 11/2004 | Cooper ................ H04M 3/527 |
| 2005/0010418 A1* | 1/2005 | McNair .................. G06F 3/038 |
| | | 704/275 |
| 2005/0010892 A1* | 1/2005 | McNair .................. G06F 8/38 |
| | | 717/101 |
| 2005/0050301 A1 | 3/2005 | Whittle et al. |
| 2005/0108348 A1 | 5/2005 | Lee |
| 2005/0268234 A1* | 12/2005 | Rossi, Jr. .............. G06F 9/453 |
| | | 715/705 |
| 2005/0278728 A1* | 12/2005 | Klementiev ........ G06F 9/45512 |
| | | 719/328 |
| 2006/0005132 A1* | 1/2006 | Herdeg, III ......... G06F 9/45512 |
| | | 715/704 |
| 2006/0057551 A1* | 3/2006 | Vashi .................. G09B 7/00 |
| | | 434/350 |
| 2006/0184888 A1* | 8/2006 | Bala .................. G06F 9/453 |
| | | 715/762 |
| 2007/0005369 A1* | 1/2007 | Potter ................ G10L 15/01 |
| | | 704/275 |
| 2007/0050191 A1 | 3/2007 | Weider et al. |
| 2007/0106495 A1 | 5/2007 | Ramsey et al. |
| 2007/0106497 A1 | 5/2007 | Ramsey et al. |
| 2007/0124263 A1 | 5/2007 | Katarlya et al. |
| 2007/0136264 A1* | 6/2007 | Tran .................... G06F 16/9535 |
| 2007/0190505 A1 | 8/2007 | Hugonnard-Bruyere et al. |
| 2007/0234224 A1 | 10/2007 | Leavitt et al. |
| 2007/0282660 A1 | 12/2007 | Forth |
| 2007/0282912 A1 | 12/2007 | Reiner |
| 2007/0294240 A1* | 12/2007 | Steele .................. G06F 16/38 |
| 2007/0297590 A1 | 12/2007 | Macbeth et al. |
| 2009/0003540 A1 | 1/2009 | Zafar |
| 2009/0077045 A1 | 3/2009 | Kirchmeier et al. |
| 2009/0132920 A1* | 5/2009 | Deyo .................. G06Q 10/06 |
| | | 715/708 |
| 2009/0157513 A1 | 6/2009 | Bonev et al. |
| 2009/0158173 A1 | 6/2009 | Palahnuk et al. |
| 2009/0158200 A1* | 6/2009 | Palahnuk .............. G06Q 30/00 |
| | | 715/781 |
| 2009/0249247 A1 | 10/2009 | Tseng et al. |
| 2009/0254836 A1* | 10/2009 | Bajrach ................ G11B 27/031 |
| | | 715/745 |
| 2009/0313299 A1* | 12/2009 | Bonev .................. G06Q 10/109 |
| 2010/0070448 A1* | 3/2010 | Omoigui .............. H01L 27/1463 |
| | | 706/47 |
| 2011/0191699 A1 | 8/2011 | Cunningham et al. |
| 2011/0246880 A1* | 10/2011 | Horton .................. G06F 9/453 |
| | | 715/708 |
| 2011/0286586 A1 | 11/2011 | Saylor et al. |
| 2012/0022872 A1 | 1/2012 | Gruber et al. |
| 2012/0069131 A1* | 3/2012 | Abelow .............. G06Q 10/067 |
| | | 348/14.01 |
| 2012/0216140 A1 | 8/2012 | Smith |
| 2012/0278740 A1* | 11/2012 | Robinson .............. G06Q 10/10 |
| | | 715/757 |
| 2012/0315881 A1 | 12/2012 | Woloshyn |
| 2013/0031476 A1* | 1/2013 | Coin .................. G06F 40/56 |
| | | 715/706 |
| 2013/0124449 A1* | 5/2013 | Pinckney .............. G06N 5/048 |
| | | 706/52 |
| 2013/0275138 A1 | 10/2013 | Gruber et al. |
| 2013/0275875 A1 | 10/2013 | Gruber et al. |
| 2013/0275899 A1 | 10/2013 | Schubert et al. |
| 2014/0037075 A1 | 2/2014 | Bouzid et al. |
| 2014/0115456 A1 | 4/2014 | White et al. |
| 2014/0177813 A1 | 6/2014 | Leeds et al. |
| 2014/0195252 A1 | 7/2014 | Gruber et al. |
| 2016/0103560 A1 | 4/2016 | Yuschik et al. |
| 2016/0162172 A1* | 6/2016 | Rathod ................ G06F 3/0481 |
| | | 715/747 |
| 2017/0004588 A1* | 1/2017 | Isaacson .............. G06Q 20/12 |
| 2018/0367484 A1* | 12/2018 | Rodriguez ........... H04L 65/403 |

* cited by examiner

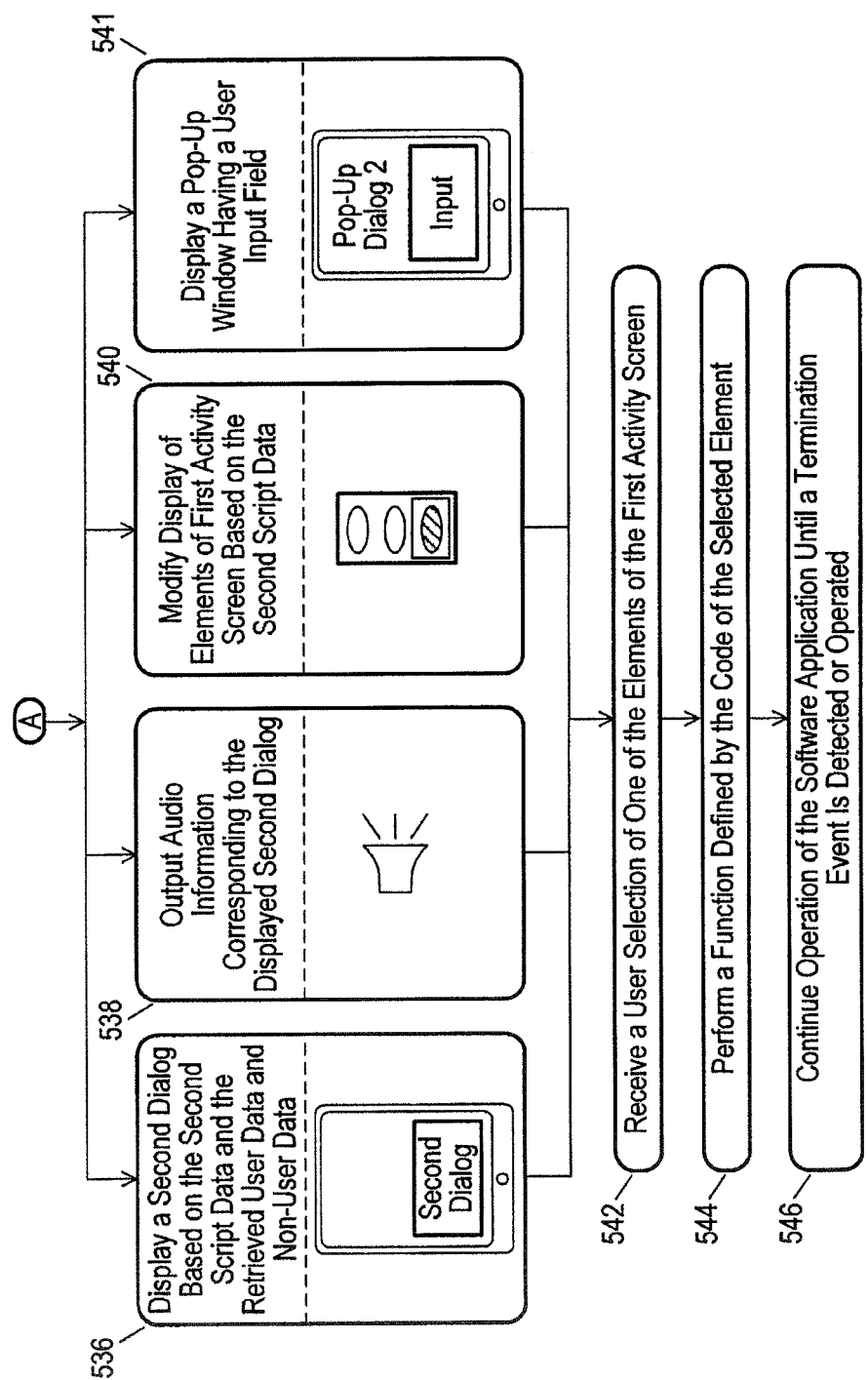

SYSTEM AND METHOD OF GUIDING A USER IN UTILIZING FUNCTIONS AND FEATURES OF A COMPUTER BASED DEVICE

CROSS REFERENCE TO RELATED APPLICATION

This application is a continuation-in-part of, and claims priority to and the benefit of, U.S. Non-Provisional patent application Ser. No. 14/593,261, titled "SYSTEM AND METHOD OF GUIDING A USER IN UTILIZING FUNCTIONS AND FEATURES OF A COMPUTER-BASED DEVICE," filed Jan. 9, 2015, which claims priority to and the benefit of U.S. Provisional Application No. 61/964,820 filed on Jan. 16, 2014, the entirety of these disclosures is hereby incorporated by reference as a part of this application.

BACKGROUND OF THE INVENTION

1. Field of the Invention

The present invention relates to methods and systems for assisting a user in utilizing functions of a computer-based device and guiding the user in utilizing various functions of the computer-based device.

2. Description of Related Art

Computer-based devices such as smart phones and tablet computers have become an integral part of daily life. Users with a wider range of technical background are interested in utilizing computer-devices for a variety of functions, such as email communications and media sharing. Unfortunately, computer-based devices have been traditionally designed for technically savvy users. More particularly, the systems are designed with the assumption that the users know the basic operation of the computer and have the ability to interpret the input choices presented to the users. For users without adequate technical expertise, such as an elderly user without sufficient prior exposure to use of computer-based devices, using a computer-based device can be a daunting task. The type and number of inputs needed from the user for completing a task can make the user experience overwhelming. The required inputs to accomplish a task and the corresponding graphic interface are difficult to discern for non-technical users. Tablet computers and smart phones include various built-in and pre-configured software applications that are not intuitive for use by a non-technical user.

There is a need in the art for a software-based method and system of guiding a user in utilizing various functions of a computer-based device in an intuitive fashion.

SUMMARY OF THE INVENTION

The present invention guides a user with a limited technical understanding in utilizing a computer-based device. For users without adequate technical expertise using a computer-based device that offers a variety of choices without a clear explanation can be a daunting task. As explained in further details, the computer-based system takes over the operation of the device and prevents the user from getting lost in the maze of alternatives present on most computer-based devices. A software-based host serves as a personal assistant for the user, thereby automatically guiding the user, step by step, through various available activities. The software-based host advantageously provides intuitive and clearly explained choices for the user. Moreover, the software-based host advantageously predicts, anticipates and/or infers the needs of the user and provides suggestions or takes actions to accommodate, converse and/or otherwise interact with the user. A limited number of activities are offered to the user, and the computer-based host guides the user during each activity. The computer-based host interfaces with various third-party activities and provides a customized user-friendly and tailored user experience. The software is designed to simplify choices by explaining the choices and presenting the choices step-by-step, in an intuitive fashion. The software gauges the level of expertise of the user through various interactions with the user and customizes the amount and/or level of guidance that is provided to the user, which provides the user a customized experience that is unique among different users. The information is displayed via elements having simple graphics. Alternatively or in addition, information can be outputted via an easy-to-follow audio message in a manner which would be intuitive for a user without adequate technical understanding. In certain embodiments, choices are offered one at a time, for example, in the form of buttons with simple graphics.

The invention advantageously personalizes the user experience by dynamically determining relevant and helpful information that a user with limited technical expertise would be interested in receiving. The information is determined based on data learned about the user and further based on non-user data such as current date, time, location, and various other types of information. The user data and non-user data can be updated as needed and accessed from a remote memory or from the Internet. The software-based host may obtain, determine and/or extract the relevant and helpful information from different sources, such as from different activities, and use the relevant and helpful information to infer learned data, e.g., interests of the user. The software-based host may actively use the learned data and provide suggestions or take action based on the learned data to personalize, customize and/or otherwise facilitate the user experience.

The information can be displayed to the user and/or conveyed via voice generated using a speaker of a computer-based device in an intuitive manner. The software-based host simplifies various tasks for the user by dynamically displaying dialogs to the user and speaking to the user. Display elements can be modified based on the dialogs in order to direct user's attention to certain elements or convey other information about display elements to the user. The combination of the foregoing means of outputting information simplifies user experience.

The software-based host may use the inferences to provide suggestions or take actions. The software-based host may convey information that is related to interests of the user, such as a suggestion or recommendation which may be inferred and learned from past activity of the user. The software-based host may use the inferred and learned data to actively take actions to anticipate the needs of the user. These suggestions, recommendations and/or actions may be conveyed to the user in various ways, such as through outputted speech or other audio, visually on the display and/or in a virtual or augmented reality.

In one embodiment, the system offers a limited number of activities in order to simplify the user interactions. The system advantageously divides activities into tasks, and tasks into sub-tasks that are presented to the user one at a time in order to simplify the interaction. The system advantageously analyzes past actions and/or inaction of the user to determine the level of technical expertise of the user. Once the system determines the level of technical expertise of the user, the system configures the number or amount of tasks and subtasks based on the level of technical expertise of the user. This allows the system to gauge the appropriate number of finite steps of guidance to convey to the user to complete the task. By gauging the number of finite steps, the system neither provides too much or too little guidance to the user. The system utilizes a dynamic text-to-speech technology in conjunction with pop-up windows in order to present simplified choices to the user one step at a time.

In one embodiment, the present invention relates to a software application installed on a computer-based device of the user. The software application serves as an overlay, thereby allowing the user to simply interact with the user interface of the software application in order to access various features and functions of the computer-based device. When the software application serves as an overlay, the software application interfaces with other third-party applications, systems or devices. The software application obtains relevant information from the other third party applications, systems or devices and reconfigures and customizes the obtained relevant information to present a different and more tailored user experience to the user. The software application may integrate related and/or relevant information from different sources, such as different third-party applications, systems or devices, to provide a customized user experience. The software application integrates with these different sources in manner that does not necessarily require the user to individually interact with each of the different sources, which minimizes the complexity and presents the same or additional learned information to the user without the need of the user to directly interact with the third-party applications, systems or devices. In a preferred embodiment, the computer-based device can be a portable electronic device such as a tablet computer or a smart phone. The software application can utilize various functions or features of the portable electronic device using an application programming interface (API).

In one aspect of the present invention, a computer-based method is provided that guides a user in operating a computer-based application running on a computer based device. The computer-based method includes operating, by a processor, a software application that runs on the computer-based device and interfaces with one or more applications on one or more remote computing devices. The computed-based method includes rendering, by the processor and on a display, a first screen having a plurality of display elements that are linked to a plurality of activities including a first activity and a second activity. The computer-based method includes receiving, by the processor, a selection of a display element of the plurality of display elements that is linked to the first activity. The computer-based method includes obtaining, by the processor and from a first remote computing device associated with the first activity, first activity information that includes first ancillary information. The computer-based method includes generating, by the processor, an inference of an interest or preference of a user based on the first ancillary information and outputting or performing, by the processor and on a display or through a speaker, a suggestion or recommendation to the user based on the inference of the interest or preference of the user.

In another aspect of the present invention, a method is provided that guides a user in operating a computer-based application running on a computer-based device. The method includes operating, by a processor, a software application that runs on the computer-based device and interfaces with one or more applications on one or more remote computing devices. The method includes rendering, by the processor and on a display, a first screen having a plurality of display elements that are linked to a plurality of activities including a first activity and a second activity. The method includes receiving, by the processor, a selection of a display element of the plurality of display elements that is linked to the first activity. The method includes obtaining, by the processor and from a first remote computing device associated with the first activity, first activity information that includes first ancillary information. The method includes extracting, by the processor, the first ancillary information from the first activity information using one or more identification tags to parse the first activity information. The method includes generating, by the processor, an inference of an interest or preference of a user based on the first ancillary information. The method includes outputting or performing, by the processor and on a display or through a speaker, a suggestion or recommendation to the user based on the inference of the interest or preference of the user.

In another aspect of the invention, a computer-based user assistance system is provided for assisting a user of a computer-based device. The system includes a memory configured to store a software application. The system includes a display configured to render a suggestion or recommendation. The system includes a speaker for generating audio messages to a user. The system includes a processor coupled to the memory. The processor is configured to execute the software application that interfaces with one or more application on one or more remote computing devices. The software application performs operations that include rendering, on the display, a first screen having a plurality of display elements that are linked to a plurality of activities including a first activity and a second activity. The operations include receiving a selection of a display element of the plurality of display elements that is linked to the first activity. The operations include obtaining, from a first remote computing device associated with the first activity, first activity information that includes first ancillary information. The operations include generating an inference of an interest or preference of a user based on the first ancillary information. The operations include outputting or performing, on the display or through the speaker, a suggestion or recommendation to the user based on the inference of the interest or preference of the user.

In certain embodiments, the processor advantageously utilizes artificial intelligence to output information that is deemed to be helpful for the user. The processor may draw inferences from collected data to proactively make suggestions or recommendations to the user or take actions without having received a user command or request. The inferences may be based on at least one of user data received regarding the user from the user and/or a helper of the user, or non-user data regarding for example, the current date, time, or weather conditions. The processor is configured to draw inferences based on the collected user data and non-user data in order to determine information that the user would be interested in receiving. The processor would take into account that the user has limited technical expertise and therefore determine contents of the information such that the outputted information and the requested inputs from the user would be easy to understand and follow for the user. The inferences drawn can further help determine the current interests of the user and redirect the flow of the user interface accordingly. The data may be drawn from different sources and learned data may be extrapolated from the received data to generate the inferences. The manner in which information is conveyed to the user can be modified to allow the user to easily follow the information and/or instructions for providing an input.

Thus, the present invention makes it possible to guide a non-technical user through various steps of an activity. An electronic host guides a user by outputting helpful information by displaying dialogs, outputting audio information, and modifying display elements.

The foregoing and other features and advantages of the present invention will become more apparent from the reading of the following detailed description of the invention in conjunction with the accompanying drawings.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIGS. 5A and 5B collectively show a flowchart diagram of a computer-based method of guiding a user in utilizing functions of a computer-based device, according to an embodiment of the present invention;

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Preferred embodiments of the present invention will now be described in detail with reference to the accompanying drawings.

The present invention relates to a computer-based user guidance and assistance system and method. The system and method can be operated using a variety of computer-based devices including but not limited to stationary computers such as a desktop computer, or portable electronic devices such as a laptop, notebook, tablet computer, or smart phones. In a preferred embodiment, the system is implemented on a tablet computer such as an Apple iPad®. The system may be compatible with a variety of operating systems such as Android or iOS.

Figure 1:
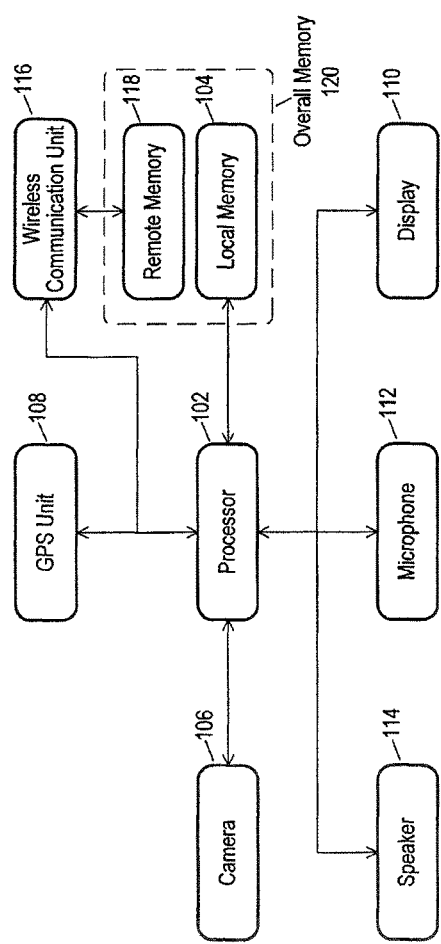
FIG. 1 is a block diagram of a computer-based device utilized by a method/system according to an embodiment of the present invention.

FIG. 1 shows a block diagram of some of the relevant components utilized by the invention. The computer-based guidance system 100 ("system 100") utilizes a processor 102 connected to a local memory 104. In one embodiment, the processor 102 includes one or more central processing units (CPUs) of a computer-based device. The local memory 104 includes a memory of the computer-based device such as a flash semiconductor memory. Data can be retrieved from or stored in a remote memory 118 as well. The remote memory 118 includes remotely located memory accessed from a host server or another computer-based device via the wireless communication unit 116. The remote memory 118 includes cloud-based memory. The overall memory 120 as used herein refers to local and remote memories, collectively. In one embodiment, the software code for implementing the steps described herein is stored partially in the local memory 104 and partially in the remote memory 118. In other embodiments, the software code can be stored locally, and updated using data received from the remote memory 118 periodically or as needed otherwise.

The processor 102 is connected to a Global Positioning System (GPS) unit 108 for determining a current location of the computer-based device. A camera 106 is provided for capturing images and/or videos. In one embodiment, the camera 106 is a camera integrated in the computer-based device.

The processor 102 determines output data that can be conveyed to the user using a display 110 of the computer-based device. In one embodiment, the display 110 is a touch-screen display screen further configured to receive inputs from the user.

A speaker 114 is also provided for conveying audio information to the user. A microphone 112 is provided for capturing an audio input received from the user. The processor 102 is configured to parse and analyze detected audio data using a speech recognition algorithm.

The processor 102 is connected to a wireless communication unit 116 configured to establish wireless data communication between the computer-based device and the remote memory 118 or another remote server or computer-based device. The wireless communication unit 116 includes antennas, wireless transmitters/receivers and related encoding/decoding components. The processor 102 can retrieve data from the Internet and/or upload data using the wireless communication unit 116.

In a preferred embodiment, the units shown in FIG. 1 are integrated in a portable electronic device such as a tablet computer or a smart phone.

Figure 2:
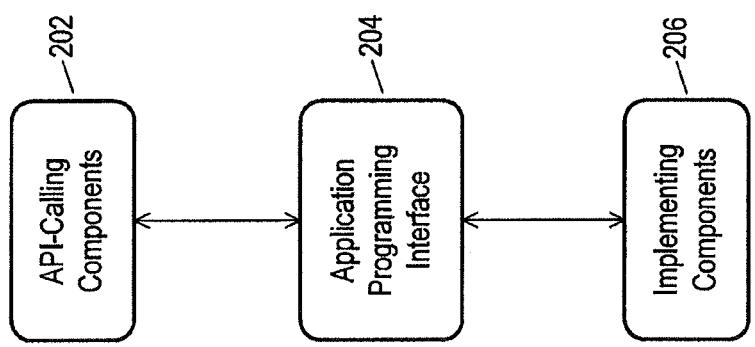
FIG. 2 is a block diagram of certain software-based components of an embodiment of the method/system of the present invention, for accessing functions and features of the computer-based device of FIG. 1.

FIG. 2 is a block diagram of software components utilized by the present invention in order to access functions and features of a computer-based device using one or more Application Programming Interfaces (APIs) 204. An API 204 is an interface implemented by a program code component or hardware component (hereinafter "implementing components") 206, which allows a program code component or hardware component ("API-calling components") 202 to access and use one or more functions, methods, procedures, data structures, classes, and/or other services provided by the implementing component 206. An API 204 can define one or more parameters that are passed between the API-calling component 202 and the API-implementing component 206. "API-calling" does not refer to calling using a telecommunication feature. Rather, it refers to referencing an API 204 in order to utilize an implementing component 206 of the underlying operating system. Using the API model, the invention utilizes functions of the computer-based device such as telecommunications, texting, emailing, and/or various other functions in order to assist the user in utilizing the computer-based device. Moreover, the invention may use the API model to access and utilize functions of a third-party or remote server, such as a web-based application on the third-party or remote server including a social networking application, an email application, a photo/video storage site and/or a remote storage. In other words, the user is able to seamlessly interface only with the user interface of the overlay software application of the present invention in order to utilize functions of the computer-based device and/or functions of the third-party or remote server.

Figure 3:
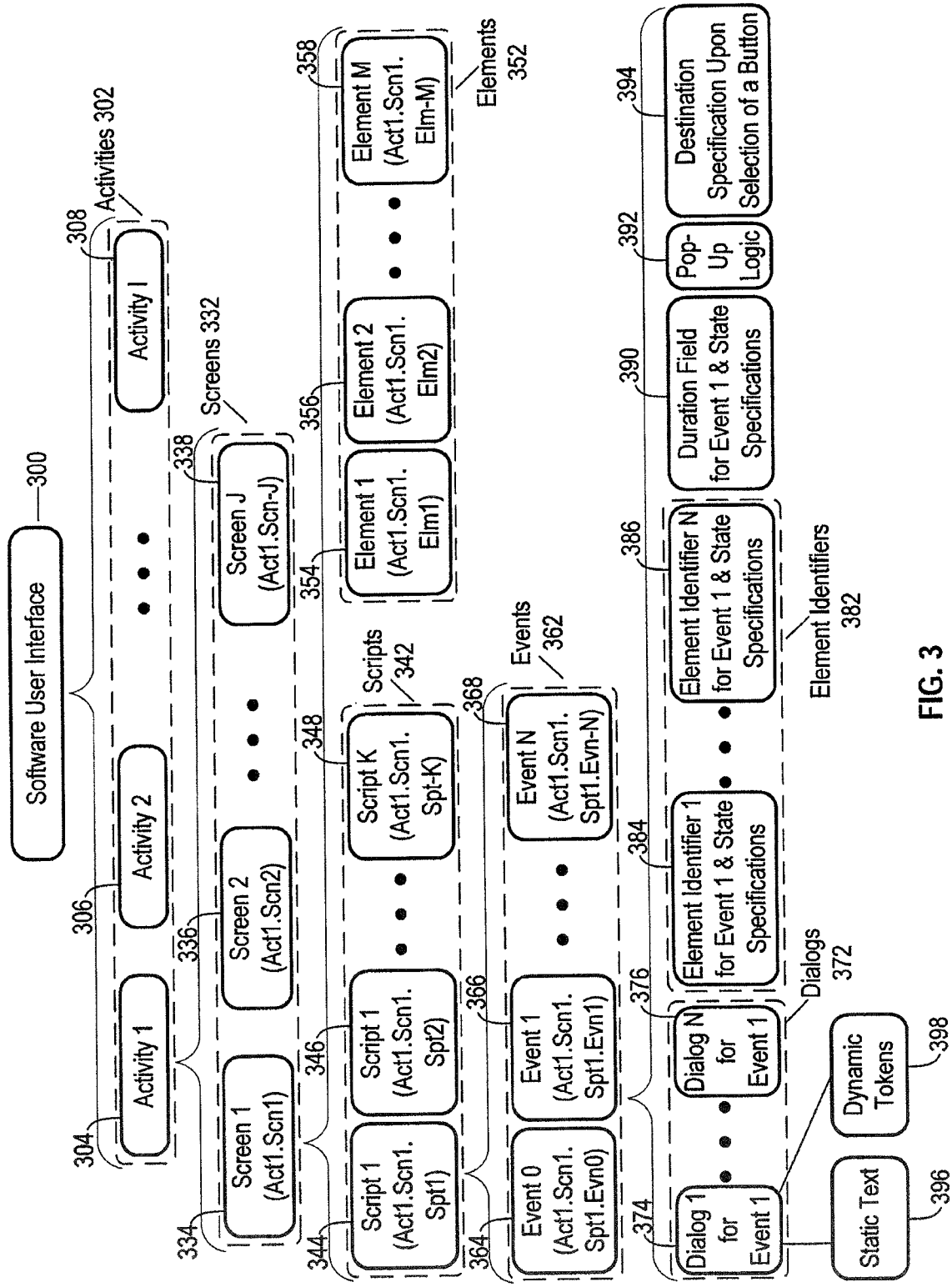
FIG. 3 is a block diagram showing software-based components of a user interface of a method/system according to an embodiment of the present invention.

In certain embodiments, the processor 102 advantageously utilizes artificial intelligence to output information that is deemed to be helpful for the user. The processor 102 is further configured to draw inferences based on at least one of user data received regarding the user from the user and/or a helper of the user, or non-user data regarding for example, the current date, time, or weather conditions. The processor is configured to parse and analyze the non-user data and/or user data. The processor is configured to draw inferences based on the collected user data and non-user data. The inferences allow the process to determine information that the user would be interested in receiving. The use of artificial intelligence to enhance the capability to infer user interests, user behavior and/or user needs is further discussed below in FIG. 14, for example. The processor 102 would take into account that the user has limited technical expertise, as discussed in FIG. 13 for example, and therefore determine contents of the information such that the outputted information and the requested inputs from the user would be easy to understand and follow for the user. The information can be displayed and/or conveyed to the user via an audio message. The inferences drawn can further help determine the current interests of the user and redirect the flow of the user interface accordingly. The manner in which information is conveyed to the user can be modified to allow the user to easily follow the information and/or instructions for providing an input FIG. 3 is a block diagram showing software-based components of a user interface of a method/system according to an embodiment of the present invention. A software-based user interface ("interface") 300 is provided for allowing the user of the computer-based device to interact with the computer-based guidance system 100. The interface 300 includes a limited number of predetermined activities 302. An activity as used herein refers to a grouping of functions performed by the computer-based device and/or a computing-based device of a third party based in part on inputs provided by the user. An activity includes certain types of interactions between the computer-based device and the user. Each activity is managed by a custom program integrated with an electronic host for guiding the user through each step of the activity.

Examples of activities are described further below with respect to FIG. 4. The activities are listed as activity 1 (block 304), activity 2 (block 306), and . . . activity i (block 302). The ellipses indicate that there can be less or more activities can be provided based on design considerations and user needs. For example, one of the activities relates to sending/receiving emails and storing certain information of the received emails.

Referring to FIG. 3, each activity of the activities 302 has a plurality of screens, but for illustration purposes, only screens 332 of activity 1 (block 304) are shown. Screen 1 of activity 1 (block 334) is identified with the abbreviation of Act1.Scn1 to indicate that the screen corresponds to activity 1, and the same applies to screens in blocks 336 and 338. A screen displays dialogs and other information for the user in order to guide the user through each step of the activity. The processor 102 is configured to move from one screen of an activity to another screen of the activity, or alternatively, to a screen of a different activity based on user inputs and expected need of the user. The processor 102 also dynamically adjusts the screen during each step of the activity.

Every screen (332) is driven by one of several possible scripts at any given time. Scripts determine the information that is outputted to the user in text or speech. The scripts (342) also dictate modifications to the user interface. As the electronic host guides the user throughout the activity, screen elements can be modified, for example, to direct user's attention to certain elements. For example, if the electronic host outputs text and speech regarding use of a help button, the help button can be highlighted and/or enabled as discussed in further details below.

Although each screen includes a plurality of scripts, only scripts 342 of screen 1 (block 344) are shown in FIG. 3 for illustration purposes. A script corresponds to a set of codes or instructions for interacting with the user when a screen is displayed. A script allows the processor 102 to determine the voice and dialog outputted to the user based on data learned about the user and non-user data such as current date and time. The script allows the processor 102 to draw inferences based on the data, and output information to the user based on the inferences. The scripts are designed to render the interaction to be simple for the user, such that the user is guided throughout the operation of an activity. The script of a screen can dictate when the process stops operating the current script and starts operating the script of another screen.

The scripts 342 can be stored in the local memory 104. An advantage of storing locally is that the scripts can be uploaded faster. Alternatively, the scripts 342 can be stored in a remote memory 118, for example, on a remote server or in an online database such as Google Drive®. The scripts 342 can be uploaded periodically, upon user request. Alternatively, the scripts 342 can be updated as needed by the host server or an authorized user, based on design considerations.

Each screen includes a plurality of elements. Elements are discrete visual items on the screen that can take the form of buttons, information boxes, lists, or other items. The elements of the present invention are designed specifically for users with limited technical expertise. The elements are configured to convey information in an intuitive manner to the user. The elements can be buttons that offer intuitive choices for the user. The elements convey information and present step-by-step choices in order to prevent a user with a limited technical expertise from getting lost in the maze of alternatives present on most computer-based devices. The elements can be HTML-coded visual elements with simplified text and/or graphics for allowing the user to readily identify his/her choices.

For illustration purposes, only elements 352 of screen 1 of activity 1 are shown in FIG. 3. The elements include buttons which can have a defined destination or task to be performed upon selection by the user. The user may select a button by simply touching or tapping the displayed button. The button can change color upon selection by the user to provide feedback to the user that the button is being selected. The user may also select a button via a voice command. The processor 102 can recognize selection of a button via a speech recognition algorithm.

Different screens can have common buttons, but some screens have unique buttons. For example, in the contacts activity, an add-contact button is unique to that activity. However, a help button would be common to various activities. Elements can be displayed directly on the screen, or in a pop-up window that is displayed as an overlay on the screen.

The scripts 342 dictate modifications to display of elements 352. As the electronic host guides the user throughout the activity, screen elements 352 can be modified, for example, to direct user's attention to certain elements 352. For example, when the electronic host outputs text and speech regarding use of a help button, the help button can be highlighted and/or enabled as discussed in further details below.

Pop-up windows are dialog boxes that guide the user through a sub-task of an activity one step at a time. The pop-up window includes a text field or a button for receiving an input from the user. For example, composing an email is a task of an activity, and can be broken down to sub-tasks using an email, which comprises several steps (a. Choose type of email, b. Enter recipient name, c. Enter body of email, etc. . . . ). A pop-up window can be sequentially displayed for each of the subtasks, after an input for a sub-task is received. The pop-up window may display a question to the user, and the user may select an accept button or a cancel button to provide input accordingly. The system analyzes the inputs, and outputs helpful information to the user based on the inputs.

Scripts 342 include lists of events 362 that are executed in sequential order. Events 362 describe the change in state of any elements that need to change from a previous event. An event can also have a pop-up logic 392 for controlling the pop-up window, the message displayed in the pop-up window, and the input received by the pop-up window. An event can also redirect the flow of the user interface 300. For example, an event can direct the process to a different screen of the current activity or to a screen of a different activity. In certain embodiments, the events 362 advantageously utilize artificial intelligence to output information that is deemed to be helpful for the user. In certain embodiments, the process takes into account that the user has limited technical expertise and therefore the executed events 362 determine contents of the information such that they are easy to follow for the user. The events 362 also determine the displayed dialogs, the generated audio message, and/or modification of display elements such that the information is conveyed to the user in an intuitive manner. The events can further redirect the flow of the user interface based on the expected interests of the user.

For illustration purposes, only events 362 of script 1 of screen 1 of activity 1 are shown. Events 362 are sequentially numbered to indicate the order of operation. The events 362 are shown as starting from "0" simply by convention. The events 362 can alternatively start as 1 or any other sequential identification. Element states can be automatically set before event "0" in block 364 is executed. Event "0" (364) modifies and establishes the initial state of the screen before subsequent events (1, 2, . . . n) (in blocks 366 and 368) are executed. This includes specifying which elements (e.g., buttons) will be visual and/or active when the screen is initially displayed. Subsequent events (blocks 366 to 368) alter at least some of the initial states specified by event "0." The events 362 may show, hide, disable, highlight, and/or perform various other functions with respect to the elements 352.

An event specifies a plurality of dialogs to be displayed either directly on the screen or on a pop-up window. For illustration purposes, only dialogs 372 for event 1 are shown. The dialogs may have static text 396 or dynamic tokens 398. The dynamic tokens 398 may be based on non-user data such as current date and time, and based on user data such as the name of the user, the birth date of the user, and other information known about the user.

One of the important features of the invention is its ability to personalize the user experience by including dynamic and relevant information when it interacts with the user. Information about the user is stored in a remote memory 118 and/or the local memory 104 database. When the data is stored remotely, the data can be transferred to the computer-based device of the user via a network connection. Scripts 342 can access this information using a dictionary of "tokens" that are integrated into the text of a script. The tokens may be derived from the activity information obtained from one or more activities. The tokens 398 reference specific and dynamic pieces of information, such as the time of day, the user's name, or the user's daily horoscope. The tokens 398 allow the electronic host to establish a personalized relationship with the user, and provide helpful information and reminders based on data learned about the user.

Referring to FIG. 3, an event (block 362) has a duration field that indicates a pause value to apply after this event (block 390). Each event can have a duration field, but for illustration purposes, only the duration field for event 1 is shown. The duration field value (block 390) may correspond to certain number of seconds. Using the duration fields, the duration and timing of the events can be controlled.

The events 362 can include state specifications (block 382) in order to change the state of an element 352. An event can enable or disable an element, or render the element visible or invisible. When an element (352) such as a button is enabled, the user is able to click the element in order to operate the task corresponding to the button, or reach a destination corresponding to the element. An event (362) can highlight an element, for example, by displaying a blinking red border around the element. An event can brighten or dim the element. The foregoing changes to element status in addition to other changes can be utilized along with outputted dialog and audio information to guide the user during an activity. This advantageously directs attention to the relevant parts of the display in order to allow the user to understand functions of an activity or the response that is needed from the user.

Each event may further include a pop-up logic 392. This allows the event 362 to control the dialogs 372 displayed in the pop-up window of a screen, and the type of input requested from the user, as discussed above with respect to the scripts 342.

The destination of certain buttons can be specified by underlying logic of the software application, which may be modified by an event. An event can specify a destination for a button upon selection by a user, as shown in block 394. For example, the event can specify that the process shall navigate to a different screen of a current activity or a screen of a different activity upon selection of a button in the current screen.

An exemplary embodiment of the invention described with respect to FIG. 3 is described below. In the exemplary embodiment, the user interface 300 is a user interface of a software application installed or pre-configured on a computer-based portable electronic device such as a tablet computer. The software application serves as an overlaid operating system, which can access various existing features and functions of the computer-based device using APIs described above with respect to FIG. 2.

The scripts of each of the screens 332 can be stored as data sheets in data workbooks. Data workbooks and sheets may be stored in an online database that can be remotely accessed via the wireless communication unit 116. The script data can be shared in such a way that an authorized device running the software application can access them. The software application accesses these workbooks directly via a web address such as a uniform resource locator (URL). The software application loads the data dynamically as needed. With the foregoing approach, the spreadsheets become the live script database for the software application.

A benefit of the exemplary embodiment is that the scripts 342 can be easily modified, and the modifications can be instantly updated to all or selected devices running the software application. In other words, the behavior of the software application (e.g., the displayed messages, and outputted audio information) can be changed in real-time.

In the exemplary embodiment, each screen has a corresponding workbook having multiple spreadsheets, with each spreadsheet including a script data set. Screen paths can be mapped to the addresses of script workbooks for each screen. The mapping data can be stored in a table of contents data sheet, thereby mapping each screen of an activity to a given URL address associated with the screen. The table of contents data sheets allow the software application to easily locate the script files.

The script workbook includes an element sheet containing the screen's element. The events can specify dialogs, element identifiers, duration fields, pop-up logic, destinations for buttons, and/or various other changes to configurations as discussed above with respect to events 362.

Each screen may have a plurality of possible scripts in order to customize the user experience based on an expectation of what information the user would be interested. The screen can be selected based on at least the number of times the user has previously utilized an activity. This allows the host to provide more information during first visits, and avoid overly repetitive output information during subsequent visits. For example, a script can be utilized for the first time the home screen is visited each day, and a different script can be utilized for subsequent visits during the same day.

Elements data sheets are provided for listing element identifiers 382 of the current screens. Elements 352 include buttons, and other discrete items on the screen that can be modified by the events. Buttons can be mapped to a task/function to be performed upon selection of the button. Examples of elements 352 that are not buttons are a list of emails, and the information header at the top of the screen. When the displayed dialog 372 relates to an element, the event can highlight or draw a box around the element to direct the user's attention to the element.

In the exemplary embodiment, the scripts 342 include tokens 398 entered directly into the script text. The token values can correspond to non-user data such as time of day, current clock time, temperature, and various other data that is not particular to the user. The token values may be learned or inferred from compiled data from various sources. The values of the token 398 can correspond to user data such as the first name of the user, the last name of the user, birth place/date of the user, home state of the user, the name of a user's helper and the helper's relationship with the user, the name of a user's relative, the gender of the user/helper, possessive pronoun (her/his), astrological sign of the user, astrological description, and/or various other information learned about the user. For example, "Hello Bill, it is now 1:35 p.m. in the afternoon and 72 degrees outside," requires the following three dynamic pieces of information: 1) the user's name, 2) the clock time, and 3) the time of day (morning, afternoon, or evening). The actual sentence created by the scripter would refer to: "Hello &FN, it is now &CT in the &TD and &TP degrees outside." The tokens 398 of &FN, &CT, &T, and &TP can be filled in by the processor 102 based on user data and non-user data.

Some token values, such as the user's name, are loaded when the app first launches. Other tokens, such as the current clock time, are updated in real time. Some tokens 398 are updated every time a screen is entered. For example, specific information about the current email such as its sender and subject line can be set every time the screen is entered. The tokens 398 can correspond to values corresponding to the screen of an activity such as the current email subject text, current email sender, current email recipient, current unviewed email count, and various other values. The process can utilize the information to proactively and dynamically output helpful information about the screen. In the foregoing example, the host can output text and audio information about recent emails by utilizing tokens related to the email list.

Figure 4:
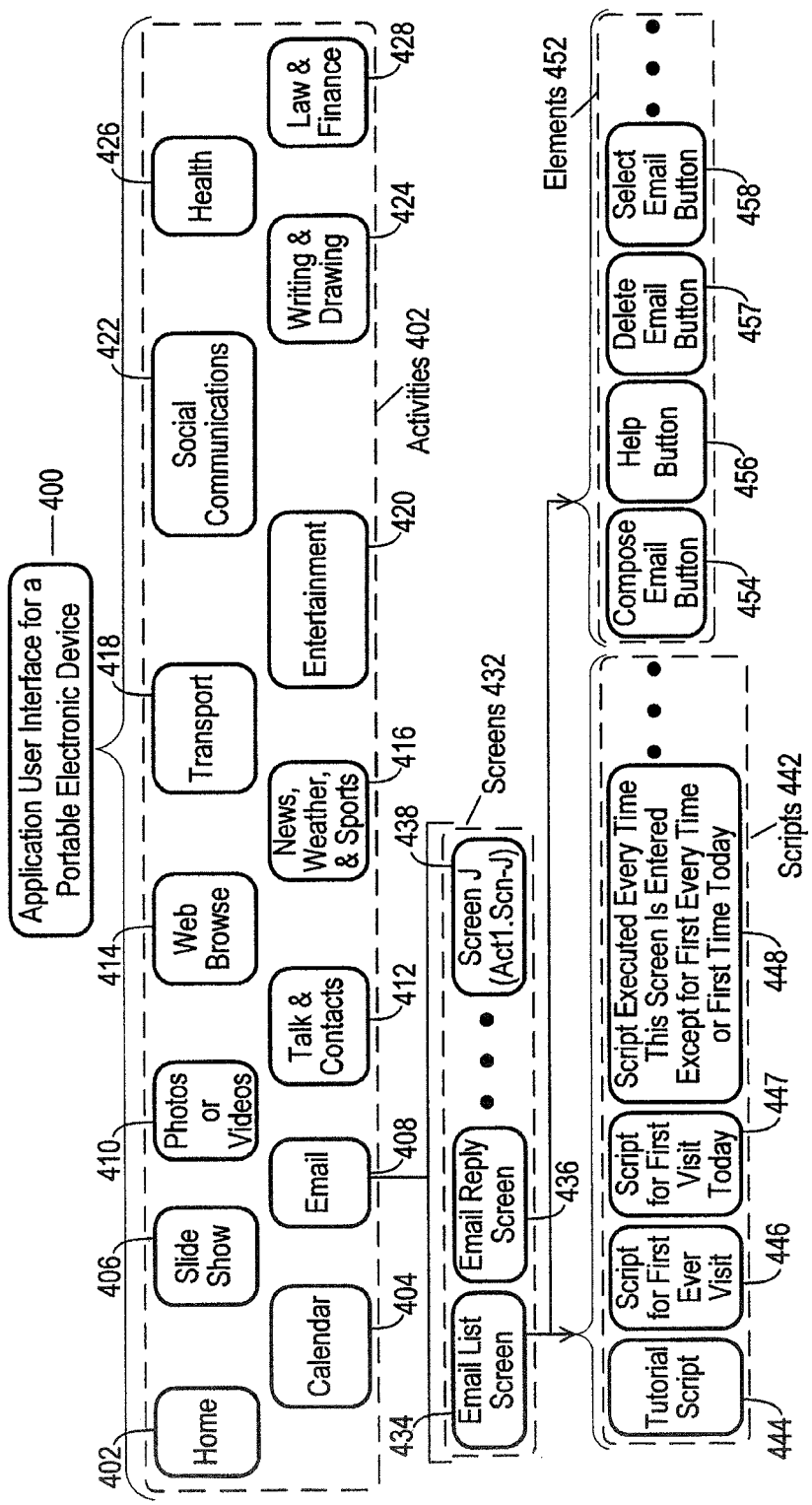
FIG. 4 is a block diagram showing examples of the activities shown in FIG. 3 according to an embodiment of the present invention.

FIG. 4 shows an exemplary embodiment described with respect to FIG. 3. In this embodiment, the system of the present invention is implemented for a portable electronic device of a user such as a tablet computer. The application user interface 400 includes activities 402. An overall description of each of the exemplary activities is provided below.

Figure 7:
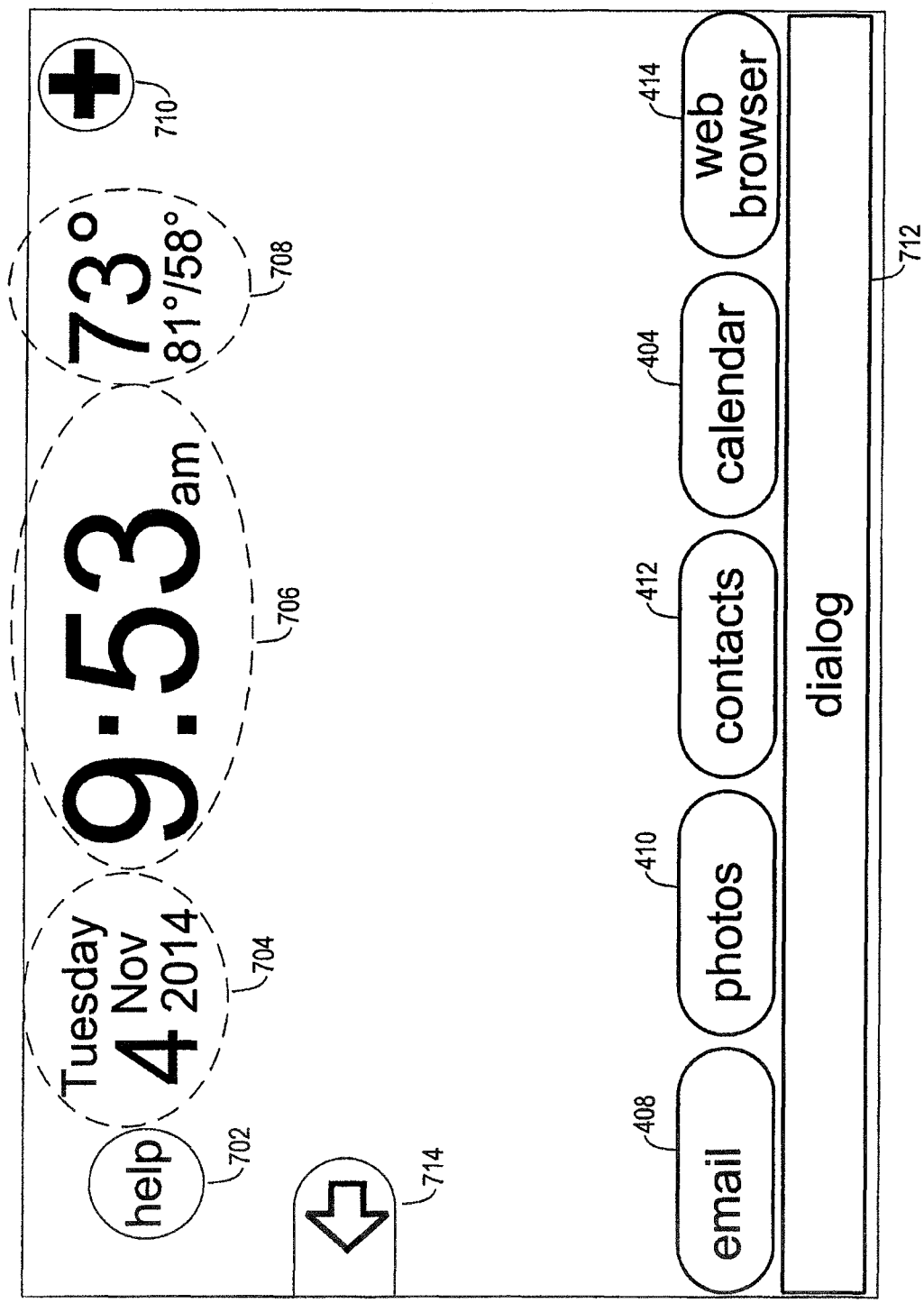
FIG. 7 is a screenshot of the user interface of a home activity according to an embodiment of the present invention.

A home activity 403 is the first screen that is operated upon initial use of the software application. FIG. 7 shows an example of a user interface screen of the home activity. The home screen displays a list of activities available to the user such as an email activity 408, photos/videos activity 410, contacts activity 412, calendar activity 404, web browse activity 414, and/or additional activities. The home screen displays current date, day of the week time, time, and temperature, as shown in 704, 706, and 708.

Figure 8:
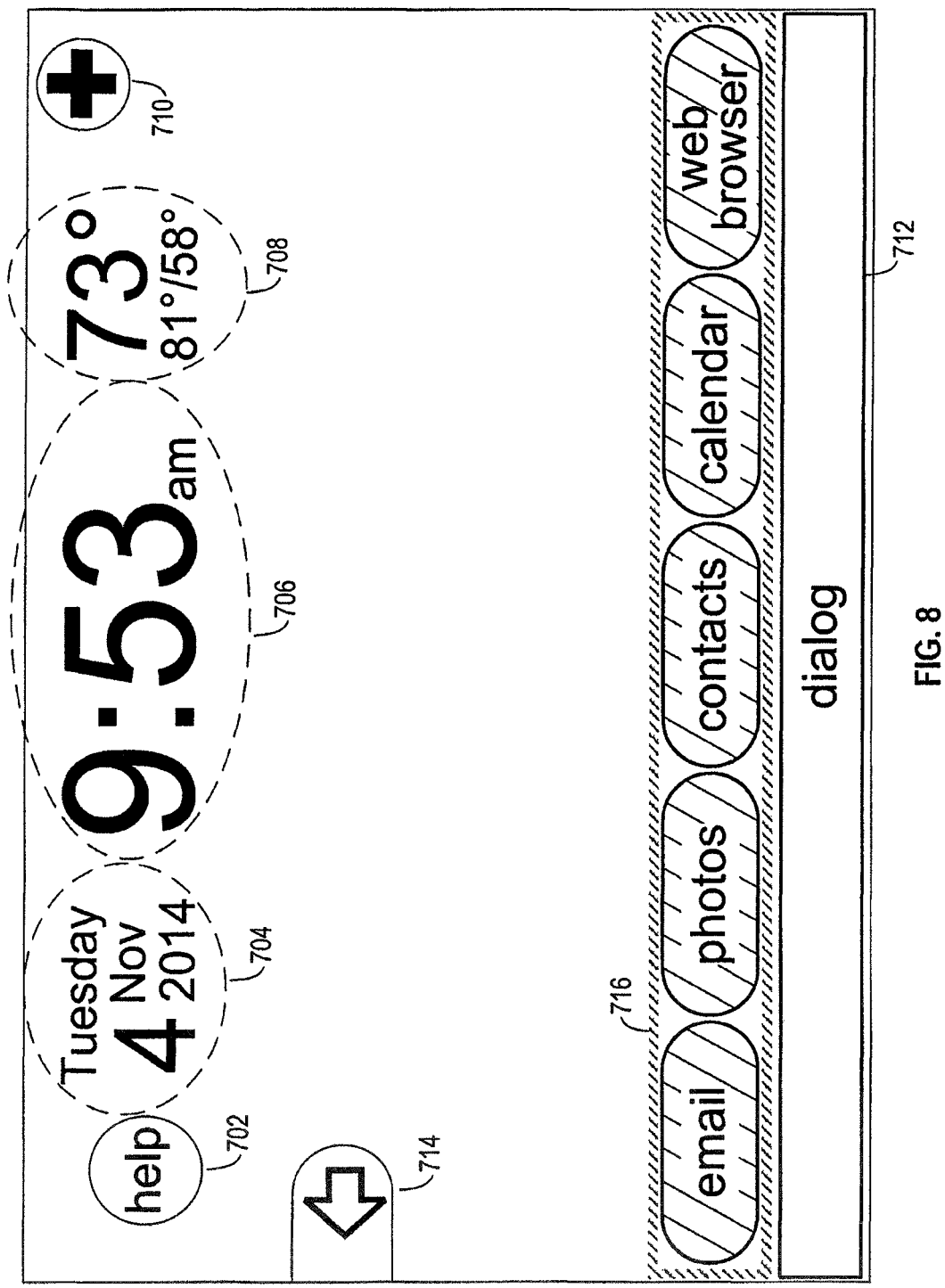
FIG. 8 is a screenshot of the user interface of the home activity shown in FIG. 7 after display of certain elements is modified according to an embodiment of the present invention.

Referring to FIG. 8, a dialog box 712 is provided for outputting a dynamic dialog to the user. As the text in the dialog box 712 is displayed, audio information can be provided using text-to-speech technology. The dialog lists words of a sentence in sequence as they are pronounced using speech outputted by the speaker in order to allow the user to easily follow the outputted information. The display can be modified as the text appears. For example, when the text relates to the activities, a boundary 716 in a different color can be drawn around the activities in order to direct the user's attention to the activities, as shown in FIG. 8. The activities can also be highlighted in a different color (for example, in yellow) in order to direct the user's attention to the activities, as indicated by the shaded area.

Referring back to FIG. 7, the home activity 403 includes a help button 702. Upon selection of the help button 702, the system can provide personal help regarding issues related to the home activity 403. The help button 702 can be included in each activity to allow the user to seek help specific to the current activity. Upon selection of the help button 702, the script data dictates the information that is outputted to the user. The outputted information can be conveyed to the user via the dialog text 712, pop-up windows, audio/video message, and/or other means. In the home activity 403, the information introduces the user to various functions/features of the software application. The information also utilized data learned about the user to personalize the message. For example, the host may call the user by his/her name, and inform him/her about the activities (e.g., email 408, photos/videos 410, talk-and-contacts 412, and/or other activities) that are available to the user.

All activities, including the home activity, include an emergency button 710. Upon selection of the emergency button 710, a helper of the user or an urgent care associate can be contacted to establish a real time audio/video communication. Upon selection of the emergency button 710, an alarm can be played using the speaker 114 to alert surrounding persons. Furthermore, audio/video communication with an operator of an emergency call center can be established. Audio/video communication functions of the computer-based device can be an implementing component 206 discussed above with respect to FIG. 2. The software application can utilize the audio/video communication features of the computer-based device using the API 204. The host can use user data and current information to communicate with a 911 operator. Other tasks as specified by user or a helper of the user can be operated upon selection of the emergency button 710.

Referring to FIGS. 4 and 7, a calendar activity 404 is provided. With the guidance of the electronic host, the user can create calendar events. The inputs for the calendar events are requested from the user step-by-step in order to simplify data entry. As discussed in further details below with respect to FIGS. 5A, 5B, and 6, calendar events are part of user data that can be received from the user and/or the helper. For example, medication reminders can be set as recurring reminders by the helper and/or the user. The processor 102 is configured to output reminder data to the user via the display 110 and/or the speaker 114.

Referring to FIG. 4, a slide show activity 406 is provided for displaying photos stored in the overall memory 120 as a slide show. The process may move to the slide show activity 406 upon request by the user or after no input is received after an idle time period. The default idle time period can be modified by the user and/or the helper.

Figure 10:
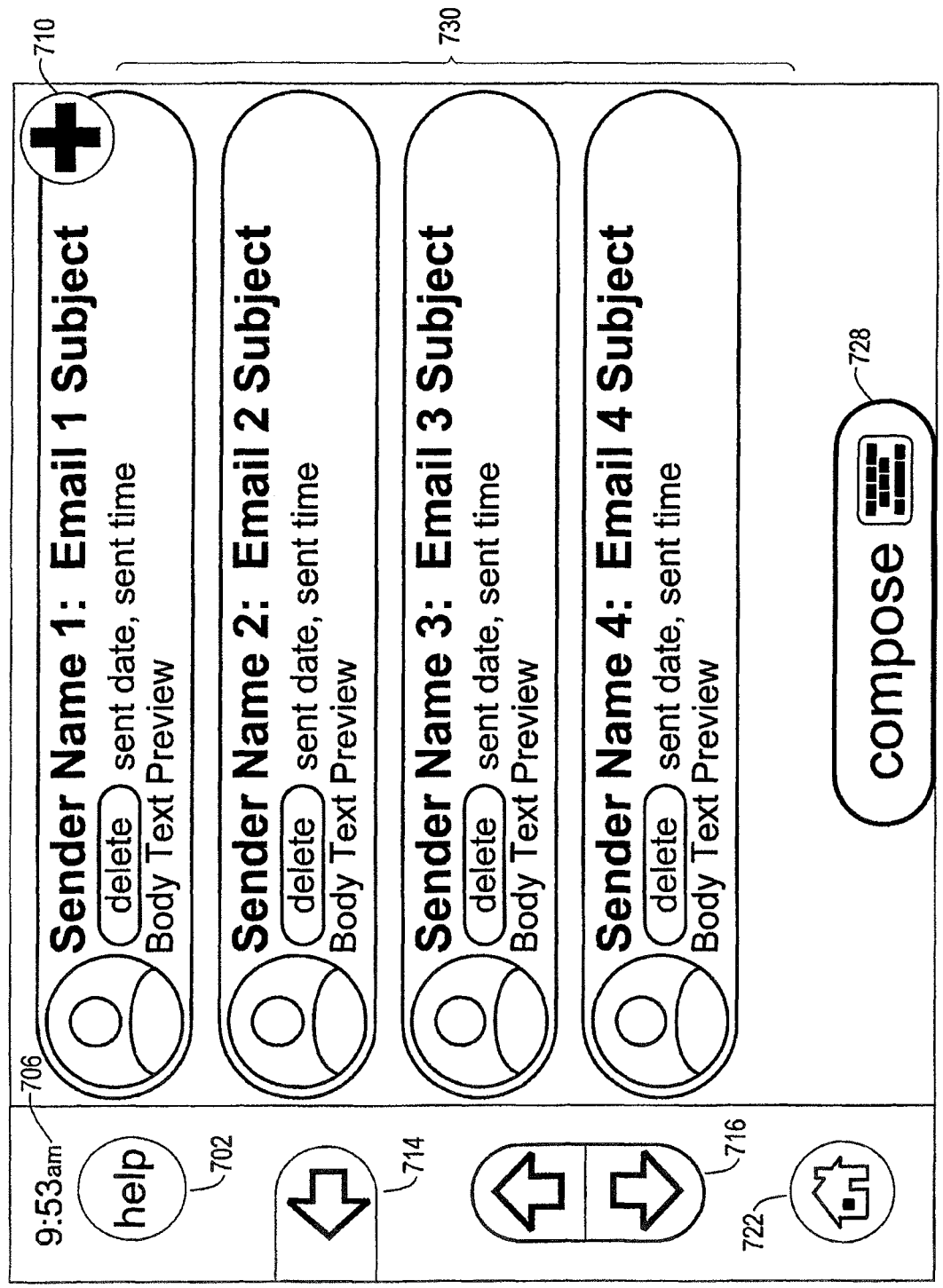
FIG. 10 is a screenshot of an email list screen of the email activity shown in FIG. 7, according to an embodiment of the present invention.

Referring to FIGS. 4 and 10, an email activity 408 is provided for guiding a user in receiving and sending emails. The user is guided with displayed dialog and voice output. The email functions are simplified to guide a user with a limited technical understanding. The host explains inputs that are needed, and requests the inputs step-by-step to simplify the tasks related to email receiving and sending. As can be seen in the email list screen show in FIG. 10, the text, graphics, type of input, and the number of needed inputs are simplified. The user can compose an email by touching the compose button 728. The user can scroll through the emails using scroll buttons 717. The emails are listed as shown in 730 in an intuitive format.

Figure 11:
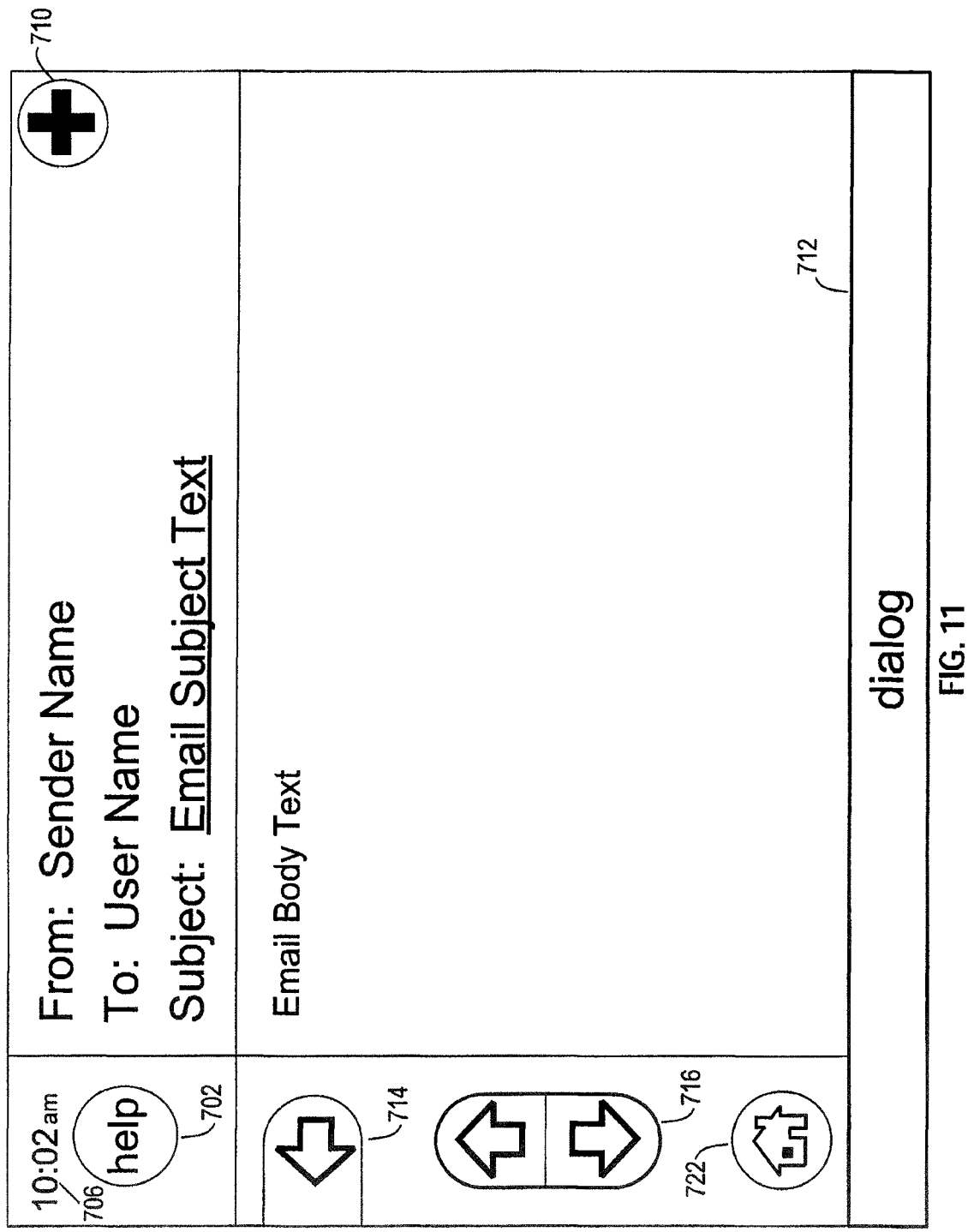
FIG. 11 is a screenshot of a reply screen of the email activity shown in FIG. 7, according to an embodiment of the present invention.

Referring to FIG. 11, the screen shows the body text of an email after the user selects a given email. The user has the option to listen to the host read the email. The processor 102 is configured to detect and parse data from the email. For example, the processor 102 is configured to detect the name of the sender (including use of reference to the contacts lists shown in FIG. 9). The host further detects the body of the email, which can be read to the user automatically or upon request.

Figure 12:
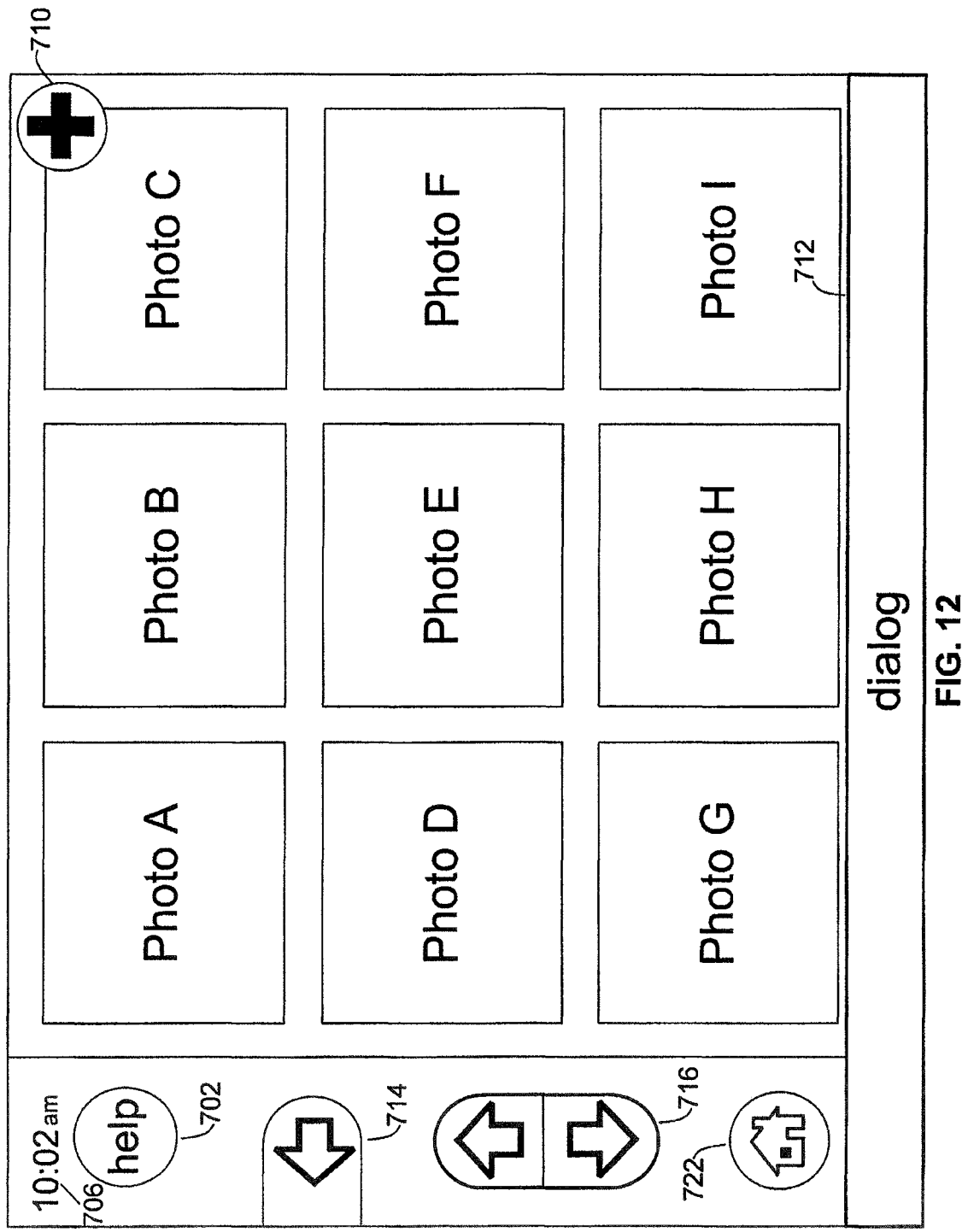
FIG. 12 is a screenshot of the user interface of the photos/videos activity shown in FIG. 7, according to an embodiment of the present invention.

Referring to FIGS. 4 and 12, a photos/videos 410 activity is provided for guiding a user in viewing, editing, sharing photos or videos. The helper can also be provided access to the photos or videos, under the configuration shown in FIG. 6. The helper and/or the user can add, modify, and/or delete photos or videos. The stored photos/videos include photos/videos captured using the camera 106 of the computer-based device, and/or photos/videos received via email, web browsing, and/or social network sharing. The user can select one of photos A-I to modify, delete or share the selected photos.

Figure 6:
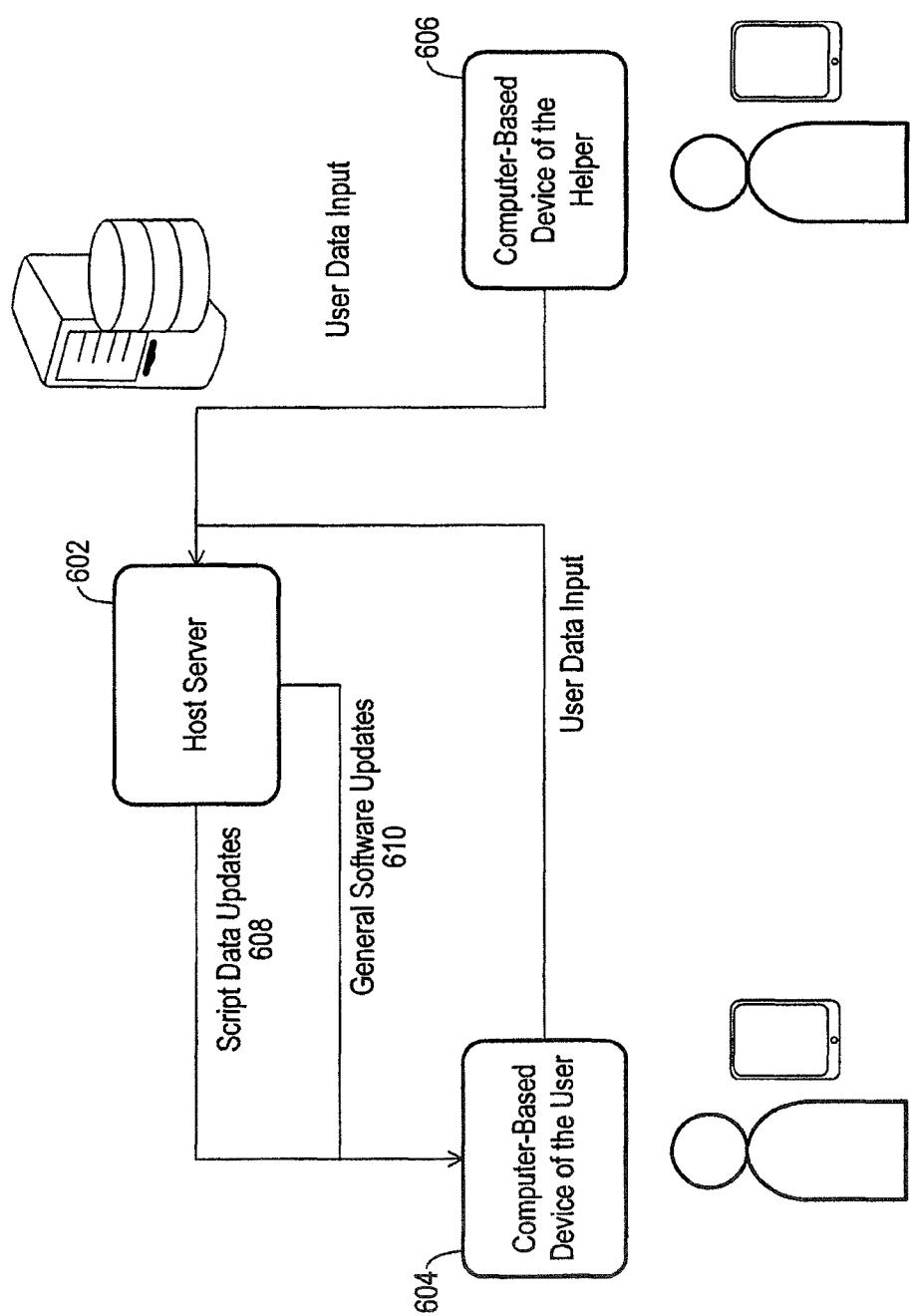
FIG. 6 is a block diagram showing software updates and user data inputs according to an embodiment of the present invention.
Figure 9:
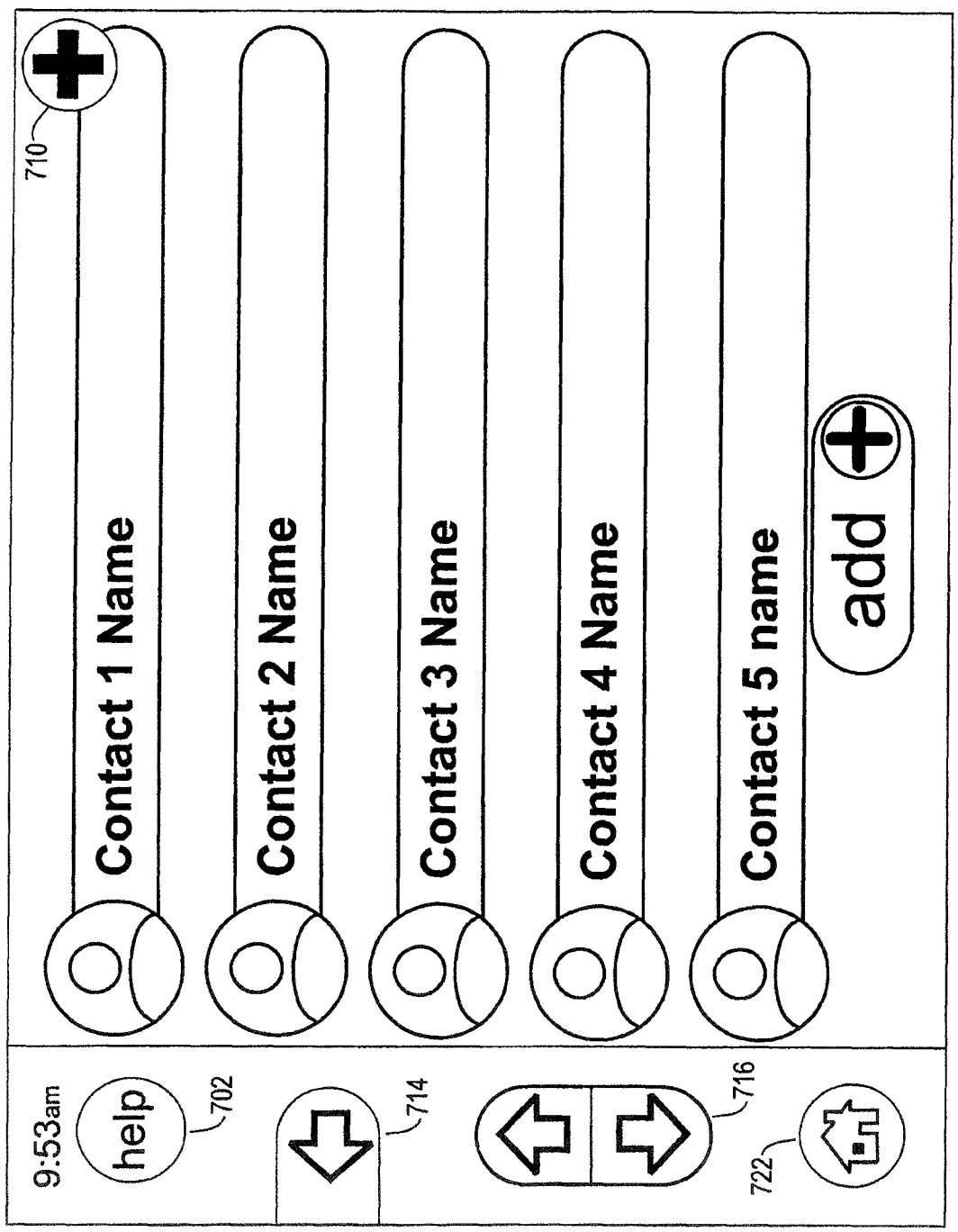
FIG. 9 is a screenshot of the user interface of the talk-and-contacts activity shown in FIG. 7, according to an embodiment of the present invention.

Referring to FIGS. 4 and 9, a talk-and-contacts activity 412 is provided. In the first exemplary embodiment, the software application is configured to utilize audio/video communication functions of the computer-based device. As shown in FIG. 9, contact information is listed using simplified text. The user can tap the touch-screen display to select a contact, and dial the associated number. The contact information corresponds to user data entered by the user and/or the helper as shown in FIG. 6. In the talk-and-contacts activity 412, the user can dial or speak a number to establish an audio/video connection with the contacts. In the talk-and-contacts activity, the host guides the user in storing contacts from received emails. The user can add, delete, or edit contacts using simplified buttons, such as the add button, and scroll buttons shown in FIG. 9.

Referring back to FIG. 4, a web browser activity 414 is provided for guiding the user in browsing the Internet. A set of pre-determined choices for websites may be provided to the user to simplify web browsing. The user may also enter search terms directly. The processor 102 can parse speech of the user detected by the microphone 112 to detect terms of an Internet search. In one embodiment, the search terms and Internet history are monitored for advertising purposes.

Referring back to FIG. 4, a news, weather, and sports activity 416 is provided. This activity allows the user to choose from preselected news databases. The system uses the appropriate input to initiate response by the target source. Other sources can be selected and added by user choice or by input provided by the helper. Collection of data from the user and the helper are discussed below in further details with respect to FIGS. 5A, 5B, and 6.

Referring back to FIG. 4, a transport activity 418 provides information on local transportation options such as taxi, hire car, limo, bus, train, metro, etc. An entertainment activity 420 is provided for allowing the user to access e-books, games, movies, music, TV/radio shows, and/or other sources. The list of sources can be predetermined in part. The user and/or the helper can modify the list. A social connections activity 422 is provided for allowing the user to network with friends in order to share emails, documents, photos/videos, etc. The social connections activity 422 can be connected to external social network websites such as Twitter® or Facebook®.

A writing/drawing activity 424 can be provided to allow the user to read, create, and/or modify documents. Documents can be modified by touch-screen input. For example, the user can select icons or use freehand options to modify a document or drawing.

A health activity 426 is provided for allowing the user to establish connections with doctors, hospitals, pharmacists, and other medical facilities. An audio/video connection can be established between the computer-based device of the user and a computer-based device of a health care provider via the wireless communication unit 116. The health activity 426 provides health information from medical website based on inputs received regarding medical conditions or records of the user. Such inputs can be provided by the user and/or the helper of the user, as discussed in further details below with respect to FIGS. 5A, 5B, and 6. Medical records of user can be sent via a secured communication link to authorized medical care providers. Health evaluations can be performed in the health activity 426 based on the data inputted by the user and/or the helper. The system can be synced with a medical evaluation device having a sensor for detecting data regarding medical condition of a user such as pulse rate. Health evaluations can further be based on the detected data and user input data. Based on the collected data, the system can output helpful medical reminders, medical evaluations, and other information to the user.

A law and finance activity 428 is provided for allowing the user to access financial news, legal help websites, and/or other financial and legal online services and information. The system can establish an audio/video connection between the user and a financial advisor or attorney.

In each of the activities described above, the system can collect data of the user to provide targeted advertising based on user's needs. Online advertising can be shown on any screen of the activities. The advertising may relate to current events and need of the user. Advertisement information can be conveyed to the user by audio messages, video, displayed text/dialog, or any other method of communication. The host may utilize outputted voice or text to present advertisement information to the user. In one embodiment, the user can set the type of data that can be used for advertising purposes.

Figure 5A:
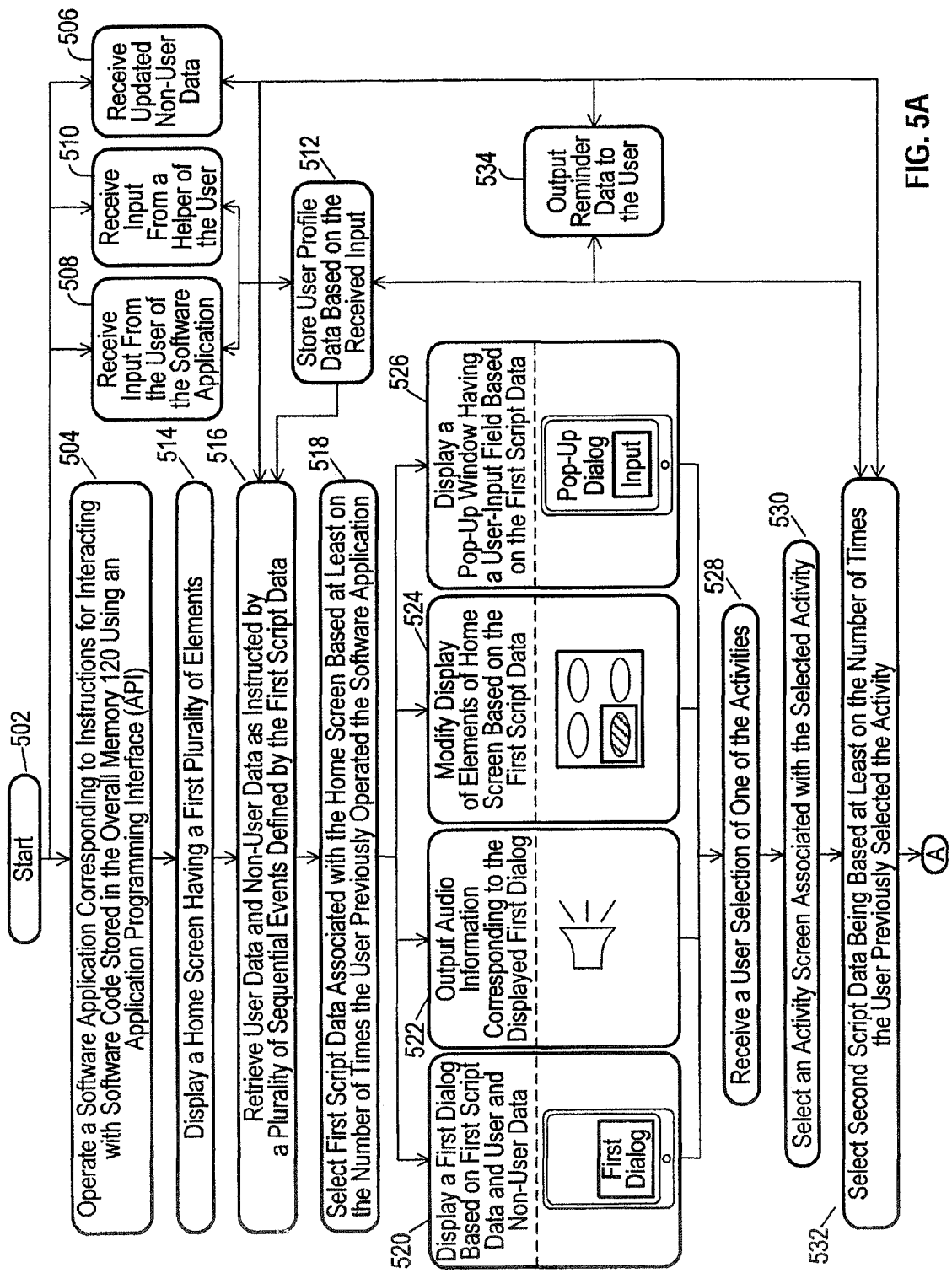

Each activity shown in FIG. 4 can be operated based on the process described below with respect to FIGS. 5A and 5B. FIGS. 5A and 5B show a flowchart diagram of an operation of the computer-based guidance system 100, according to an embodiment of the invention. In block 504, the processor 102 operates a software application corresponding to instructions for interacting with software code stored in the overall memory 120 and/or otherwise retrieved from the web. This can be performed using the API components described above with respect to FIG. 2. API-calling components 202 utilize implementing components 206 via an API 204 to assist and guide the user throughout each activity.

Blocks 506, 508, 510, and 512 correspond to obtaining user data and non-user data. Blocks 506, 508, 510, and 512 are not necessarily performed in the order shown in FIG. 5A. The user and non-user data can be retrieved and/or updated at any time, when or before the information is needed. In block 506, updated non-user data are received. The non-user data include data that are not specific to the user of the portable electronic device. The non-user data include current time, location, weather conditions, and/or other information that is not personal to the user. In block 508, data is received from the user of the software application. Data about the user can also be received from a helper of the user as shown in block 510. In block 512, the user profile data is stored based on the collected data. An exemplary embodiment of receiving and updating user profile data based on inputs of the user and/or inputs provided by a helper is described below in further details with respect to FIG. 6.

Figure 14:
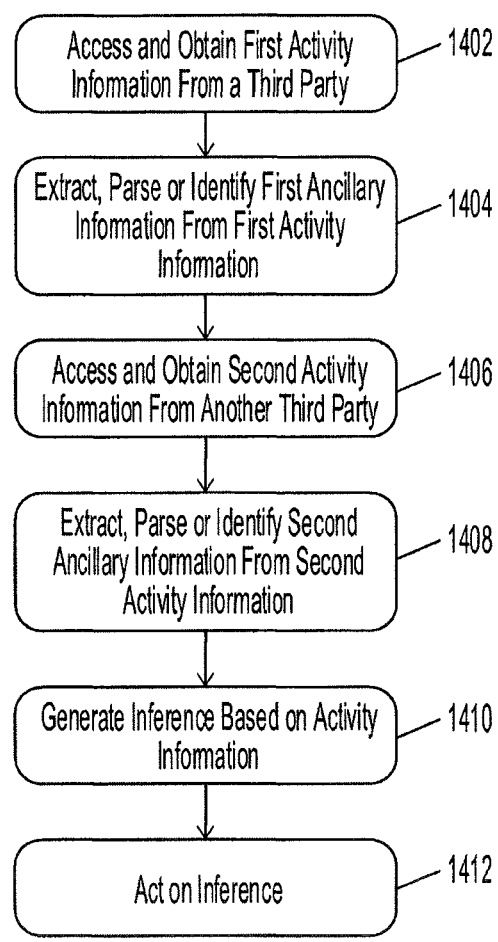
FIG. 14 shows a flowchart diagram of a computer-based method of integrating different sources of data, inferring learned data from the integrated data and acting on the learned data so that the method/system can assist and converse with the user, according to an embodiment of the invention.

Throughout the use of the software application, and/or when the application is not being used, the user can receive reminders, as shown in block 534. The processor 102 is configured to draw inferences based on the user data and non-user data, and output helpful reminders to the user. For example, if the helper of the user or the user has previously provided a medication schedule, the processor 102 can output reminders based on the current time and other information learned about the user. FIG. 14 further describes the generation of inferences to provide suggestions or recommendations.

In block 514, a home screen is displayed, which has a first plurality of elements. A subset of the elements includes icons or buttons associated with the home activity. In block 516, the processor 102 selects first script data from a plurality of script data associated with the home screen. The selection can be based at least on the number of times the user previously operated the software application. As described above with respect to FIG. 3, the amount and type of outputted information are based on the expected preference of the user. During the first time the user visits a screen, a comprehensive explanation of the activities is provided because the user would expect additional guidance with respect to different functions of the screen as compared with the subsequent visits.

In block 516, user data and non-user data are retrieved as instructed by a plurality of sequential events defined by the first script data. In block 518, the events are successively operated as discussed above with respect to block 362 of FIG. 3.

The first script data for the home screen and corresponding sequential events dictate whether and how blocks 520, 522, 524, and/or 526 are performed. In block 520, a first dialog is displayed based on the first script data and the retrieved user and non-user data, as shown for example in dialog 712 of FIG. 7.

In block 522, audio information is outputted using the speaker 114. The audio information may correspond to the displayed first dialog using a text-to-speech algorithm. The computer-based system may be pre-configured with a text-to-speech dictionary. The pre-configured dictionary includes certain pronunciations. The system of the present invention has the advantage of supplementing the pre-configured dictionary using a dictionary supplement stored in the local memory 104 and/or the remote memory 118. The supplement dictionary can provide pronunciations that would supplement or override the pronunciations stored in the pre-configured dictionary. For example, the supplement dictionary would indicate that the numbers of "911" would be pronounced as "nine-one-one" instead of "nine hundred and eleven." This pronunciation would take precedence over the default dictionary when "911" is pronounced in a speech directed to the user.

In block 524, display of elements of the home screen is modified based on the displayed dialogs and/or outputted audio information. For example, when a particular element is being described in blocks 520 and/or 524, the element can be highlighted. Other functions can be performed on the elements as discussed above with respect to FIG. 3. In block 526, a pop-up window with a user-input field and a second dialog is displayed. The pop-up logic was described above with respect to blocks 342 and 392 of FIG. 3.

Upon a user selection of a particular activity in block 528, the processor 102 selects an activity screen associated with the selected activity. The processor 102 selects a second script data from a plurality of script data associated with the selected activity screen. The selection is based at least on the number of times the user previously selected the activity.

Figure 13:
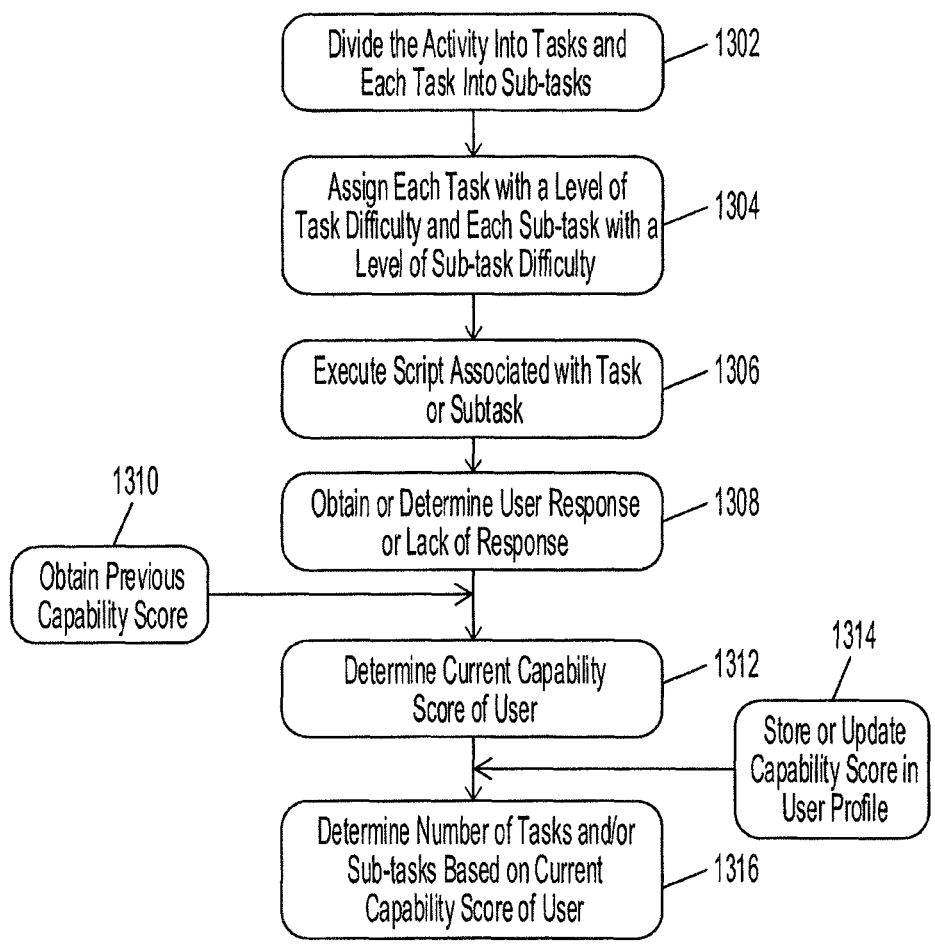
FIG. 13 shows a flowchart diagram of a computer-based method of determining the level of technical expertise of the user so that the method/system can guide the user in utilizing functions of a computer-based device, according to an embodiment of the present invention.

Upon receiving a user selection of one of the activities in block 528, an activity screen is selected in block 530. In block 532, the processor 102 selects second script data from a plurality of script data associated with the selected activity screen. The selection can be based at least on the number of times the user previously selected the activity. As described above with respect to FIG. 4, the process is mindful of the amount and type of information that the user would be interested in. During the first time that a user visits a screen, the user would expect additional guidance with respect to different functions of the activity as compared with the subsequent visits. FIG. 13 shows a flowchart diagram of an operation of the computer-based guidance system 100 to determine the level of guidance to provide to the user when the user visits a screen, according to an embodiment of the invention.

In block 536, a second dialog is displayed based on second script data and the received user data and non-user data. For example, if the selected screen is an email list screen, the second dialog corresponds to the newly received emails and/or whether the user is interested in responding to the emails. In block 538, audio information is outputted using the speaker 114. The information corresponds to the displayed second dialog. In block 540, display of elements of the home screen is modified based on the displayed dialogs. For example, when a particular email is being described in block 536, the email can be highlighted.

In block 541, a pop-up window with a user-input field and a second dialog is displayed. The pop-up logic was described above with respect to blocks 342 and 392 of FIG. 3. In block 542, a user selection of one of the elements of the first activity screen is received. The element may be a button with a specified function. For example, the compose button 728 in FIG. 10 corresponds to a compose email function. In block 544, a function defined by the code of the selected element (e.g., button) is performed.

The system advantageously guides the user in using various functions of the device by presenting inputs or response choices in a simple step-by-step fashion. In one embodiment, only those choices necessary for the next step are displayed to eliminate confusion. The user can set which form of inputs are preferred including, where appropriate: touch, click, swipe, multi-finger touch or swipe, gestures, image recognition, voice, sound, movement of the device, and other methods.

As shown in block 546, the operation of the software application continues until a termination event. The termination event may be a user request to terminate the software application temporarily or permanently. If no termination event is detected, the process navigates through different screens of activities based on user inputs, similarly to the process described above with respect to blocks 504-544.

FIG. 6 is a block diagram showing software updates and user data inputs according to an embodiment of the present invention. The host server 602 stores user data, which can be inputted by a computer-based device 604 of the user and/or the computer-based device 606 of the helper of the user. A helper as used herein refers to a relative, loved one, friend, caretaker, assistant, advisor, a trusted associate, and/or any other person with authorized access to provide user data. The helper can log into a website connected with the host server 602 to provide user data. The user profile and preferences can be defined and updated based on data provided by the user and/or the helper. The user data can include other information such as health factors, contacts, calendars, preferences, reminders, financial information, and various other types of information regarding the user. The user data can be utilized to personalize the interactions between the electronic host and the user, and to provide helpful information based on the user data as set forth above with respect to FIGS. 3, 5A, and 5B. For example, the user and/or the helper can provide information regarding a medication schedule. The system can output reminders based on the user data. The user data can be stored in the local memory 104 and/or the remote memory 118.

The application software code can be stored locally, and updated using script data updates 608 received from the remote memory 118 periodically or as needed otherwise. This advantageously allows the scripts 342 to be updated without re-installing, re-configuring, or updating the overall software application. This allows software developers to modify the behavior of the method/system and update all connected computer-based systems instantaneously. For example, the behavior can be changed in terms of the dialog or speech that is outputted, pop-up windows, and/or various other features of the system that are dictated by the scripts as described above with respect to FIGS. 3, 4, 5A, and 5B. In addition, if the overall software needs an update, general software updates data 610 can be transmitted from the host server 602 to the computer-based device 604. The processor 102 would utilize the general software updates data 610 to update the software of the computer-based device 604. As such, the method shown in FIG. 6 advantageously allows the host server 602 to selectively update parts of the software application installed on the computer-based systems of the users instantaneously.

Each activity shown in FIG. 4 can be operated based on the process described with respect to FIGS. 5A and 5B. With each activity, the computer-based guidance system 100 executes a script that provides guidance through various means, e.g., dictated speech, textually or verbally, or modified display elements, that guide or provide assistance to the user to navigate the screens of the activity. The computer-based guidance system 100 may divide the activity into tasks and sub-tasks to correspond with a level of technical expertise of the user to avoid providing too little or too much guidance. This can be performed using the API components described above with respect to FIG. 2. API-calling components 202 utilize implementing components 206 via an API 204 to assist and guide the user throughout each activity. Thus, the user has a customizable experience based on the level of technical expertise of the user.

FIG. 13 shows a flowchart diagram of an operation of the computer-based guidance system 100 to determine the level of guidance to provide to the user when the user visits a screen, according to an embodiment of the invention. In block 1302, after the processor 102 operates the software application and presents a screen associated with a selected activity or a home screen, the processor 102 divides the activity into multiple tasks. A task may be a function of an activity. Each task may be divided into multiple sub-tasks. A sub-task may be an instruction, step, function call or other division of the task that when executed, implemented or otherwise performed in conjunction with or in sequence with another sub-task completes the task or function. The multiple sub-tasks may be linked in an order or sequentially so that when executed complete a task. And, when multiple tasks are completed, in an order or sequentially, the completed tasks may execute or otherwise perform the activity. The number, amount, type or kind of tasks or sub-tasks may, initially, be based on a default setting or capability score of the user. The default setting or capability score may maximize the granularity of the instructions or guidance to provide complete assistance to the user until a current capability score of the user is determined, which represents the current technical expertise of the user.

Each task or sub-task may be associated with particular instructions or guidance related to or correspond to user interactions to complete the task or sub-task. The computer-based guidance system 100 may present the instructions or guidance that relate to or correspond to the user interactions that are needed to complete the task or sub-task. The instructions or guidance may be presented in a dialog box, outputted through dictated speech or text, or provided through a modification of a display element, for example. As such, the amount of instructions or guidance may correspond to the number and/or type of sub-tasks or tasks. That is, as the computer-based guidance system 100 divides the activity into more tasks and more sub-tasks, the computer-based guidance system 100 may provide more detailed instructions or guidance to assist the user to perform the activity. As a user needs less instructions or guidance due to a greater level of technical expertise, the computer-based guidance system 100 may divide the activity into less tasks and sub-tasks, which provide the instructions or guidance to assist the user to perform the activity.

For example, an email activity may be divided into multiple tasks, such as composing an email, replying to an email and/or presenting the email. The multiple tasks may be divided into multiple sub-tasks. When a user is composing the email, the computer-based guidance system 100 may divide the task of composing the email into sub-tasks, such as filling out the contents of the email, filling out the receiver email address, selecting a sender email address if the user has multiple email accounts and/or filling out the subject line. For each of these sub-tasks, the computer-based guidance system 100 may initially provide instructions or guidance in the form of dialog boxes, dictated or outputted speech and/or other output to assist the user in navigating the task.

Once the computer-based guidance system 100 divides the activity into multiple tasks and sub-tasks, in block 1304, the computer-based guidance system 100 may assign each of multiple tasks and sub-tasks with a level of difficulty. The level of difficulty represents a technical skill level to complete the tasks or sub-task. For example, attaching a file or attachment to an email may be considered more difficult than inputting contents into the body of the email because a user must provide user input to attach the file or attachment, locate and search for the file or attachment and confirm the selection of the file or attachment into the email, whereas, typing contents into the body only involves only typing text into the body using a keyboard or other user input. And thus, attaching the file may be assigned a higher level of difficulty than filling in the body text.

The task may have an overall level of difficulty for the task, which incorporates the difficulty level of each and every sub-task that the task is composed of, and each sub-task may have an individual level of difficulty for the sub-task that represents the difficulty level to compete the sub-task. Different tasks, sub-tasks and activities may have the same or different levels of difficulty, and as a user completes a task, sub-task or activity, the user attains a level of technical expertise. As a user completes more difficult tasks, sub-tasks and/or activities, the computer-based guidance system 100 associates the user with a higher capability score that represents a higher level of technical expertise.

When the user has selected an activity, the computer-based guidance system 100 executes one or more scripts associated with the activity, in block 1306. The execution of the one or more scripts may include modifying one or more display elements to draw the attention of the user, the output of dictated speech, either textually and/or orally, to guide the user to complete a sub-task or task, or the display of a dialog box or other informational element to assist the user to complete the sub-task and/or task.

Before, during or after when the computer-based guidance system 100 executes the one or more scripts, the computer-based guidance system 100 monitors and continues to monitor user response including user input, any user activity and/or lack of user activity or response, in block 1308. The computer-based guidance system 100 may monitor various parameters, such as the amount of time necessary for the user to provide valid user input to complete a sub-task or the validity of the user input. A valid user input is a correctly formatted user input based on the sub-task. For example, for a sub-task associated with a recipient or sender's email address, the user input would have to include a correctly formatted email address including an "@" symbol and a top-level domain name, such as ".com" or ".net".

The computer-based guidance system 100 may measure the amount of time to provide valid user input from when a screen is presented associated with the activity, and determine the validity of the user input to assist in determining a current capability score of the user, which represents a level of technical expertise of the user. The amount of time that the computer-based guidance system 100 waits for valid user input may represent the difficulty the user has in completing the sub-task. If the user, for example, completes the sub-task before the script finishes providing the instructions or guidance to assist the user, this may indicate that the user has a higher level of expertise because the user is capable of completing the sub-task without the guidance or instructions to assist the user. If the user, for example, is unable to complete the sub-task in an allotted time, such as approximately 35 seconds after the guidance or instructions have been provided, this may indicate that the user does not have a high level of expertise and must wait to comprehend the guidance and instructions before completing the sub-task. If the user, in another example, provides invalid user input, even after the guidance and instructions for the sub-task have completed, this may indicate that the user has a low level of expertise and may need additional guidance and instructions to complete the sub-task. The amount of guidance or instructions that a user needs based on the level of technical expertise of the user affects the number and/or types of tasks and/or sub-tasks that the computer-based guidance system 100 divides the activity into.

In block 1310, the computer-based guidance system 100 may obtain a previous capability score for the user that was previously stored in a user profile. The previous capability score may be included within the user profile data and obtained from the local memory 104. The previous capability score represents the level of expertise of the user prior to completing the task or sub-task associated with the activity and may be subsequently updated when the user completes the task, sub-task or activity.

After retrieving or obtaining the previous capability score of the user and determining the user response, the computer-based guidance system 100 determines a current capability score of the user, in block 1312, which represents the level of technical expertise of the user, based on the user response. The current capability score of the user may also be based on the previous capability score of the user, which is a score that represents the level of technical expertise of the user over the cumulative or historical interactions between the computer-based guidance system 100 and user. The current capability score may represent an adjustment to the previous capability score, and so, the cumulative history of the learned experiences of the user are accounted when determining the amount of guidance or instructions to provide to the user along with the user response to the screen presenting the activity.

As the user completes sub-tasks, tasks or activities and does so faster, quicker and/or without guidance or instructions to assist, the current capability score increases because the computer-based guidance system 100 recognizes that the level of technical expertise of the user has increased because the user provided valid user input in a timely manner. If the user is unable to complete the sub-tasks, tasks or activities, the current capability score decreases because the computer-based guidance system 100 recognizes that the user had difficulty, and so, the computer-based guidance system 100 may need to provide additional guidance or instructions to assist the user to complete the activity. The computer-based guidance system 100 may provide more weight to recent interactions between the user and associated screen than past interactions.

The computer-based guidance system 100 may account for the level of difficulty of the sub-task, task or activity when determining the current capability score. When a user completes a more difficult sub-task, task or activity, the computer-based guidance system 100 may increase or associate the completion with a higher current capability score than when a user completes a less difficult sub-task, task or activity. Moreover, when a user fails to complete an easier sub-task, task or activity, the computer-based guidance system 100 may decrease or associate the failure with a lower current capability score than when the user fails a more difficult sub-task, task or activity. The levels of difficulty of the sub-task, task or activity may have been previously assigned. By doing so, the computer-based guidance system 100 may better estimate the level of technical expertise of the user by not penalizing the failure of difficult tasks, as much, and by rewarding completion of difficult tasks.

Moreover, when the user completes a sub-task, task or activity, the user has likely attained a level of technical expertise that allows the user to complete similar sub-tasks, tasks or activities with a similar or same level of difficulty. Thus, the computer-based guidance system 100 factors the level of technical expertise that the user has attained when providing guidance or instructions for other sub-tasks, tasks or activities. Additionally, if the user has completed the sub-task, task or activity, prior to the computer-based guidance system 100 providing guidance or instructions to assist, the user may no longer need guidance or instructions for similarly complex sub-tasks, tasks and/or activities.

Once the computer-based guidance system 100 determines the current capability score of the user, the computer-based guidance system 100 may store the current capability score of the user within the user profile of the user in the local memory 113, in block 1314. The computer-based guidance system 100 may update previous capability score of the user within the user profile with the current capability score for later retrieval by subsequent scripts.

The computer-based guidance system 100, in block 1316, determines the number of tasks and/or sub-tasks that the computer-based guidance system 100 will divide a subsequent sub-task, task and/or activity based on the current capability score of the user. The computer-based guidance system 100 may reduce the number of tasks and/or sub-tasks that an activity is divided into when the current capability score is higher, such as within a first threshold range, which indicates that the user is more proficient. The computer-based guidance system 100 may increase the number of tasks and/or sub-tasks that an activity is divided into when the current capability score is lower, such as within a second threshold range that is less than the first threshold range, which indicates that the user is less proficient. More tasks and sub-tasks provide greater granularity to the guidance or instructions provided, i.e., more steps and more guidance that the computer-based guidance system 100 provides to assist the user to perform the activity.

FIG. 14 shows a flowchart diagram of an operation of the computer-based guidance system 100 to integrate different sources of data, infer learned data from the integrated data and act on the learned data, according to an embodiment of the invention. This can be performed using the API components described above with respect to FIG. 2. API-calling components 202 utilize implementing components 206 via an API 204 to assist and guide the user throughout each activity. Thus, the user has a customizable experience where the computer-based guidance system 100 anticipates and predictively suggests, recommends or acts to assist the user. The processor 102 operates the software application and infers or otherwise anticipates user behavior, user interests and/or user needs and suggests, recommends or acts to assist the user.

In block 1402, after the computer-based guidance system 100 receives a user selection of an activity, as discussed in block 528, the computer-based guidance system 100 may access and obtain activity information from another computing device, such as a remote server of a third party, which is associated with the activity. The activity information may include user data, e.g., user-generated data, and/or non-user data, e.g., system or device generated data, which is provided by the other computing device that is related to the user-selected activity. For example, activity information for an email activity may include an attachment, body text, and/or sender or receiver address.

The user-generated data is information that is formed or created directly and/or intentionally from a user action or input. For example, an image, a picture, a video, and/or an audio recording is user-generated data because the user may initiate the action of taking the picture, the video and/or the audio recording. Other examples of user-generated data include text in an email message and/or the receiving and/or sending address in the email message. The system or device generated data may include ancillary information that may be embedded within the activity information. The ancillary information may include any additional information that relates to, describes or is otherwise associated with activity information. For example, when a picture or image is taken, geo-location data, such map coordinates including a latitude and longitude of the location where the picture or image was taken, may be embedded within the picture or image. Moreover, other information, such as a description, caption or facts about the picture or image may be included in the ancillary information.

The processor 102 may use the API-calling components 202 to access and obtain first activity information from the other computing device. For example, when the social connections activity 422 is selected, the computer-based guidance system 100 may access a social networking website stored on a remote server and obtain activity information that includes a news feed, shared images and/or status updates. In another example, when the email activity 408 and/or photos/videos activity is selected, the computer-based guidance system 100 may access an email server or a cloud storage site on a remote server and obtain activity information that includes files, such as images or photographs, text documents or audio/video files along with corresponding text or descriptions.

The software application of the computer-based guidance system 100 may run on top of and as an overlay to the functions of another application on the remote server or other computing device of a third-party. When an activity is selected, the computer-based guidance system 100 uses the API 204 to access and obtain activity information from the other application on the other computing device. The activity information may include photos, videos, audio, contact information, location information, documents, feeds, messages, text and/or other data related to the activity. The computer-based guidance system 100 presents the activity information in one or more screens related to the activity, as shown in FIG. 10 for example, which are customizable.

The computer-based guidance system 100 may extract, parse or identify ancillary information from and/or included within the activity information, in block 1404. The computer-based guidance system 100 may parse or extract the ancillary information from the activity information by analyzing the format of the activity information obtained using the API 204. The computer-based guidance system 100 may identify tags, such as an image tag and/or a location tag, to identify that the contents within the activity information is an image that was taken at a particular location, for example. Within the activity information, the computer-based guidance system 100 may identify other tags, such as a description tag, and extract or parse the corresponding ancillary information related to the identified tag. The ancillary information may be used to make inferences when combined with other activity information and/or ancillary information from other computing devices.

In some implementations, the ancillary information may be interpreted, measured or otherwise determined from the activity information. For example, the ancillary information related to an email activity 408 may include the frequency of when a user emails a message to a recipient and/or the frequency of when the user receives a message from a sender. Other ancillary information that may be interpreted, measured or otherwise determined from the activity information may include the frequency of a purchase order, such as a refill of a medication, and user preferences, such as restaurants or stores frequented, which may be determined from financial statements, invoices, shipping or tracking information or placed orders sent to and received in the activity information in the email activity 408.

In block 1406, the computer-based guidance system 100 may receive another user selection of a different activity or have previously received a user selection of the different activity, and in response, the computer-based guidance system 100 accesses and obtains the activity information from a different computing device associated with the different activity. The computer-based guidance system 100 may access and obtain the activity information from the different computing device in a similar manner as described above in block 1402.

After the computer-based guidance system 100 accesses and obtains the activity information from the different computing device, the computer-based guidance system 100, similarly as in block 1404, extracts, parses or otherwise identifies the ancillary information from within the activity information from the different computing in block 1408. The computer-based guidance system 100 uses the accessed and obtained activity information to generate user inferences of the behavior or interests of the user.

In block 1410, the computer-based guidance system 100 generates inferences based on the activity information from the various activities. For example, the computer-based guidance system 100 interpolates or extrapolates the known data to infer and form learned data that was not directly obtained from one of the computing devices associated with an activity. The computer-based guidance system 100 may combine the activity information from the various activities including the ancillary information included within the activity information to form the inferences related to interests, preferences and/or behavior of the user. For example, the inferences may include the frequency of when a user refills a prescription and the most recent occasion to refill the prescription based on the frequency the user places an order for a medication and the timing of the last purchase order, which may have been determined or obtained from ancillary information retrieved after selecting the email activity 408. By examining the frequency of and the most recent placed order for the medication, the computer-based guidance system 100 may infer when the medication needs to be refilled. Moreover, the computer-based guidance system 100 may extract the dosage and identify the medication from the activity information and determine a frequency of when to take the prescription. Additionally, if the computer-based guidance system 100 determines that the user regularly shops at a pharmacy based on activity information associated with the user's web browse activity 414, the computer-based guidance system 100 may make an inference of when the refill is necessary and that the user intends to or would like to purchase the refill of the particular dosage of the identified medication at the pharmacy when the refill is needed.

In another example, the inferences may include the frequency of when the user responds to an email or contacts an individual. If the ancillary information may indicate that the user receives an email from another individual or sends an email to the individual on a periodic or regular basis, and thus, the computer-based guidance system 100 may infer that the user regularly contacts the individual, and suggest, recommend or otherwise inform the user to contact the individual if there is no communication between the user and the individual for a period of time. Other examples of inferences include a user's interest in a product, a conversation topic, a location or an event, which may result in the computer-based guidance system 100 suggesting the purchase of the product or travel to the location or the event.

Once the inference is generated, the computer-based guidance system 100 acts on the inference in block 1412. The computer-based guidance system 100 may provide a suggestion, recommendation or take another action based on the inference. The computer-based guidance system 100 may initiate the action, such as making a suggestion or recommendation or taking action, proactively, i.e., not reactively in response to a user command or input. For example, when the computer-based guidance system 100 determines that the user has not contacted an individual that the user has regularly contact with, the computer-based guidance system 100 may prompt or otherwise suggest to the user to contact the individual. Based on other data obtained from other activities, such as a contact activity, the computer-based guidance system 100 may determine that there is an event in the life of the individual, such as a birthday or a holiday, and pre-populate an email card, order a card or flowers, or otherwise take action to initiate contact with the individual because the individual is both a regular contact, as determined from the activity information of the email activity 408, and because the day is a special day for the individual, as determined from the activity information of the contact activity. In another example, the computer-based guidance system 100 may order a refill of the prescription and remind the user that a refill is needed based on the activity information that indicate the regular purchases of the prescription and the identification of the prescription. The computer-based guidance system 100 may even order a specific flower or bouquet based on preferences of the individual, which may be recognized or derived from images from photos and/or images received in the activity information from one of the activities.

In some implementations, the computer-based guidance system 100 presents the suggestion, recommendation or action in a virtual or augmented reality environment. For example, the computer-based guidance system 100 may obtain the activity information from the email activity 408 which may indicate that the user has various purchases of a particular category of clothes and the activity information from the web browse activity 414 which may indicate that the user has been visiting a particular store's website. The computer-based guidance system 100 may infer that the user is interested in the particular category of clothing and suggest clothing within the particular category. The computer-based guidance system 100 may display the suggested clothing on an avatar of similar appearance to the user in a virtual environment in response to the generated inference to show the user the appearance of the clothing on the avatar. The computer-based guidance system 100 may have generated the avatar of similar appearance to the user by extracting the image of the user from images, photo and/or videos accessed and obtained from the photos/video activity 410.

Moreover, this virtual or augmented reality environment may allow the user to interact with other users, make conversation with the other users, and gather additional activity information, which may be by the computer-based guidance system 100 to develop inferences, such as the user interests for conversation topics. The computer-based guidance system 100 may then use these inferences to converse with the user beyond suggestions, recommendations and/or taking action.

Similarly, the computer-based guidance system 100 may infer that a user has interest in a travel location if the user regularly views or receives photos or images of a destination via the activity information from the email activity 408, photos/videos activity 410 and/or web browse activity 414. The computer-based guidance system 100 may extract location data from ancillary information of photos, images or videos obtained from the photos/videos activity 410, the web browse activity 414 and/or the email activity 408 and render images of the avatar within those locations in the virtual or augmented reality to show to the user a picture of the user at the location. The computer-based guidance system 100 may allow the user to tour the location by obtaining information about the location and rendering the surrounding environment to allow the user to tour the surrounding areas of the location.

When the computer-based guidance system 100 makes suggestions or recommendations, the computer-based guidance system 100 may output the suggestions or recommendations in dictated speech. The dictated speech may incorporate the dynamic tokens based on the user data and non-user data. Moreover, the non-user data may include the ancillary information extracted from the activity information from different activities. For example, the computer-based guidance system 100 may extract the location and description of an image obtained from the social connections activity 422 and infer that the user is interested in the location. As such, the computer-based guidance system 100 may output dictated speech that suggests that the user visit the location and provide a description of the location. The computer-based guidance system 100 may combine activity information from the social connections activity 422 and obtain additional activity information that describes the location from the web browse activity 414 and incorporate the additional activity information into the outputted dictated speech. After a certain number of visits or clicks of the image, which may be determined from the ancillary information, the computer-based guidance system may initiate the suggestion or recommendation even when not prompted by the user for a desired location and/or destination, for example. In some implementations, the computer-based guidance system 100 may take other action, such as pre-populate an email message using the dynamic tokens that are filled or inferred using the ancillary information. This customizes the user experience.

As set forth in the embodiments described above, the integrated host advantageously guides a user in an intuitive fashion through various available activities. The foregoing embodiments and variations may be appropriately combined either partially or wholly. While only certain presently preferred embodiments of the present invention have been described in detail, as will be apparent to those skilled in the art, certain changes and modifications may be made in embodiment without departing from the spirit and scope of the present invention as defined by the following claims.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A computer-based method of guiding a user in operating a computer-based application running on a computer-based device, the computer-based method comprising:

operating, by a processor, a software application that displays an overlay on a screen that has a first display element that accesses and interfaces with a first application on a first remote computing device associated with an email activity and a second display element that accesses and interfaces with a second application on a second remote computing device associated with a media activity;

rendering, by the processor and on a display, the screen having the first display element that is linked to the email activity and the second display element that is linked to the media activity;

receiving, by the processor, a selection of the first display element that is linked to the email activity;

dividing the email activity into a plurality of tasks and each task of the plurality of tasks into a plurality of sub-tasks;

assigning each task of the plurality of tasks a level of task difficulty and each sub-task of the plurality of sub-tasks a level of sub-task difficulty, wherein the level of task difficulty is a function of the level of sub-task difficulty of each sub-task that composes the task;

determining a capability score of the user that represents a level of technical expertise of the user based on an amount of time to receive a user response from when a task screen associated with each task and each sub-task is presented to the user and a validity of the user response to each task and each sub-task;

determining a first number of tasks or sub-tasks for a division of a subsequent activity when the capability score is a first capability score and a second number of tasks or sub-tasks for the division of the subsequent activity when the capability score is a second capability score, the first number of tasks or sub-tasks being different than the second number of tasks or sub-tasks;

obtaining, by the processor and from the first remote computing device associated with the email activity, email activity information that includes an attachment, body text, or a sender or a receiver address found within an email;

parse or extract, by the processor and from the email activity information, the attachment, the body text or the sender or the receiver address;

generating, by the processor, an inference of an interest or preference of the user based on the attachment, the body text or the sender or the receiver address found within the email; and outputting or performing, by the processor and on the display or through a speaker, a suggestion or recommendation to the user based on the inference of the interest or preference of the user.

2. The computer-based method of claim 1, further comprising:

receiving, by the processor, a selection of the second display element that is linked to the media activity;

obtaining, by the processor and from the second remote computing device associated with the media activity, media activity information that includes a photograph or a video and a corresponding text or description of the photograph or the video.

3. The computer-based method of claim 2, wherein generating the inference of the interest or preference of the user is further based on the photograph or the video and the corresponding text or description of the photograph or the video.

4. The computer-based method of claim 1, wherein the email activity information includes a frequency of when the user receives the email from a sender of the email, wherein generating the inference of the interest or preference of the user is further based on the frequency of when the user receives the email from the sender of the email.

5. The computer-based method of claim 1, wherein the email activity information includes a frequency of when the user sends the email to a recipient of the email, wherein generating, by the processor, the inference of the interest or preference of the user is further based on the frequency of when the user sends the email to the recipient of the email.

6. The computer-based method of claim 1, wherein the inference of the interest or preference of the user is a conversation topic, a product, a location or an event.

7. The computer-based method of claim 1, further comprising:

providing instructions to perform the subsequent activity based on the first number of tasks or sub-tasks or the second number of tasks or sub-tasks.

8. The computer-based method of claim 1, wherein the email activity information includes the attachment and generating the inference of the interest or preference of the user is based on the attachment.

9. A computer-based method of guiding a user in operating a computer-based application running on a computer-based device, the computer-based method comprising:

operating, by a processor, a software application that runs on the computer-based device and interfaces with one or more applications on one or more remote computing devices;

rendering, by the processor and on a display, a first screen having a first display element that is linked to an email activity and a second display element that is linked to a media activity;

receiving, by the processor, a selection of the first display element that is linked to the email activity;

dividing the email activity into a plurality of tasks and each task of the plurality of tasks into a plurality of sub-tasks;

assigning each task of the plurality of tasks a level of task difficulty and each sub-task of the plurality of sub-tasks a level of sub-task difficulty, wherein the level of task difficulty is a function of the level of sub-task difficulty of each sub-task that composes the task;

determining a capability score of the user that represents a level of technical expertise of the user based on an amount of time to receive a user response from when a task screen associated with each task and each sub-task is presented to the user and a validity of the user response to each task and each sub-task;

determining a first number of tasks or sub-tasks for a division of a subsequent activity when the capability score is a first capability score and a second number of tasks or sub-tasks for the division of the subsequent activity when the capability score is a second capability score, the first number of tasks or sub-tasks being different than the second number of tasks or sub-tasks;

obtaining, by the processor and from a first remote computing device associated with the email activity, email activity information that includes an attachment from an email;

extracting, by the processor, the attachment from the email activity information using one or more identification tags to parse the email activity information;

generating, by the processor, an inference of an interest or preference of the user based on the attachment from the email; and outputting or performing, by the processor and on the display or through a speaker, a suggestion or recommendation to the user based on the inference of the interest or preference of the user.

10. The computer-based method of claim 9, further comprising:
receiving, by the processor, a selection of the second display element;
obtaining, by the processor and from a second remote computing device associated with the media activity, media activity information that includes a photograph or a video and a corresponding text or description of the photograph or the video.

11. The computer-based method of claim 10, wherein generating the inference of the interest or preference of the user is further based on the photograph or the video and the corresponding text or description of the photograph or the video.

12. The computer-based method of claim 9, wherein the inference of the interest or preference of the user is a conversation topic, a product, a location or an event.

13. The computer-based method of claim 9, further comprising:
providing instructions to perform the subsequent activity based on the first number of tasks or sub-tasks or the second number of tasks or sub-tasks.

14. A computer-based user assistance system, comprising:
a memory configured to store a software application;
a display configured to render a suggestion or recommendation;
a speaker for generating audio messages to a user; and
a processor coupled to the memory and configured to:
execute the software application that interfaces with one or more applications on one or more remote computing devices, wherein the software application performs operations comprising:
rendering, on the display, a first screen having a first display element that is linked to an email activity and a second display element that is linked to a media activity;
receiving a selection of the first display element that is linked to the email activity;
dividing the email activity into a plurality of tasks and each task of the plurality of tasks into a plurality of sub-tasks;
assigning each task of the plurality of tasks a level of task difficulty and each sub-task of the plurality of sub-tasks a level of sub-task difficulty, wherein the level of task difficulty is a function of the level of sub-task difficulty of each sub-task that composes the task;
determining a capability score of the user that represents a level of technical expertise of the user based on an amount of time to receive a user response from when a task screen associated with each task and each sub-task is presented to the user and a validity of the user response to each task and each sub-task;
determining a first number of tasks or sub-tasks for a division of a subsequent activity when the capability score is a first capability score and a second number of tasks or sub-tasks for the division of the subsequent activity when the capability score is a second capability score, the first number of tasks or sub-tasks being different than the second number of tasks or sub-tasks;
obtaining, from a first remote computing device associated with the email activity, email activity information that includes an attachment or body text of an email;
generating an inference of an interest or preference of the user based on the attachment or the body text of the email; and
outputting or performing, on the display or through the speaker, the suggestion or recommendation to the user based on the inference of the interest or preference of the user.

15. The computer-based user assistance system of claim 14, wherein the operations further comprise:
receiving a selection of the second display element;
obtaining, from a second remote computing device associated with the media activity, media activity information that includes a photograph or a video.

16. The computer-based user assistance system of claim 15, wherein generating the inference of the interest or preference of the user is further based on the photograph or the video.

17. The computer-based user assistance system of claim 14, wherein the inference of the interest or preference of the user is a conversation topic, a product, a location or an event.

18. The computer-based user assistance system of claim 14, wherein the operations further comprise:
providing instructions to perform the subsequent activity based on the first number of tasks or sub-tasks or the second number of tasks or sub-tasks.

* * * * *